(12) United States Patent
Zimmerman et al.

(10) Patent No.: US 9,350,083 B2
(45) Date of Patent: May 24, 2016

(54) PORTABLE SATELLITE COMMUNICATION SYSTEM

(71) Applicant: HARRIS CORPORATION, Melbourne, FL (US)

(72) Inventors: Kurt A. Zimmerman, Indialantic, FL (US); Mark C. Retting, Palm Bay, FL (US); Robert A. Cox, Malabar, FL (US); Van Truong, Orlando, FL (US); Erich Haeussler, II, Melbourne, FL (US); Lee L. Garrett, Melbourne, FL (US); Victor Woodling, Palm Bay, FL (US); Anthony Vergamini, Melbourne Beach, FL (US); Tyron Millen, Cocoa, FL (US)

(73) Assignee: Harris Corporation, Melbourne, FL (US)

( * ) Notice: Subject to any disclaimer, the term of this patent is extended or adjusted under 35 U.S.C. 154(b) by 721 days.

(21) Appl. No.: 13/788,463

(22) Filed: Mar. 7, 2013

(65) Prior Publication Data

US 2014/0152492 A1    Jun. 5, 2014

Related U.S. Application Data

(60) Provisional application No. 61/609,307, filed on Mar. 10, 2012.

(51) Int. Cl.
| | |
|---|---|
| *H04B 7/185* | (2006.01) |
| *H01Q 15/16* | (2006.01) |
| *G01S 1/04* | (2006.01) |
| *H01Q 1/08* | (2006.01) |

(52) U.S. Cl.
CPC .............. *H01Q 15/162* (2013.01); *G01S 1/04* (2013.01); *H01Q 1/08* (2013.01); *Y10T 29/49018* (2015.01); *Y10T 403/32631* (2015.01)

(58) Field of Classification Search
CPC ....... H04B 7/185; H01Q 1/08; H01Q 15/162; Y10T 403/32631; Y10T 29/49018

USPC .......................................................... 342/352
See application file for complete search history.

(56) References Cited

U.S. PATENT DOCUMENTS

| | | | | |
|---|---|---|---|---|
| 5,257,034 | A * | 10/1993 | Turner ................. | H01Q 15/161 343/840 |
| 7,218,289 | B2 | 5/2007 | Trajkovic et al. | |
| 8,462,078 | B2 * | 6/2013 | Murphey ............... | H01Q 1/288 343/915 |
| 2004/0196207 | A1 * | 10/2004 | Schefter ............... | H01Q 1/1235 343/878 |
| 2010/0328190 | A1 * | 12/2010 | Proffitt ................. | H01Q 15/162 343/915 |
| 2012/0325973 | A1 * | 12/2012 | Vezain ..................... | B64G 1/66 244/172.6 |

FOREIGN PATENT DOCUMENTS

WO     WO 2006041354 A1 *  4/2006  .......... H01Q 15/162

* cited by examiner

*Primary Examiner* — Harry Liu
(74) *Attorney, Agent, or Firm* — Fox Rothschild LLP; Robert J. Sacco; Carol E. Thorstad-Forsyth

(57) ABSTRACT

Systems and methods for providing a Portable Satellite Communication ("PSC") antenna. The PSC antenna (100) comprises: a Parabolic Segmented Antenna ("PSA") reflector (102) with a plurality of identical and interchangeable panels (106) that can be stowed in a nested stacked arrangement; a plurality of interchangeable feedhorn assemblies (104) that can be coupled to a center hub (110) via a quick-connect mechanism (112); an adjustment mechanism (2512, 2602, 2604) for adjusting an angular orientation of the feedhorn assemblies relative to the center hub; a transceiver (202) that can be coupled to a convex side of the PSA reflector; a base panel (120) which is coupled to a tripod positioning structure (118) such that reflector wind moment loads can be transferred through a base panel to the tripod positioning structure; and a tripod positioning structure with folding legs (3102, 3104) and hard stops (3306) against which the folding legs can be preloaded.

66 Claims, 42 Drawing Sheets

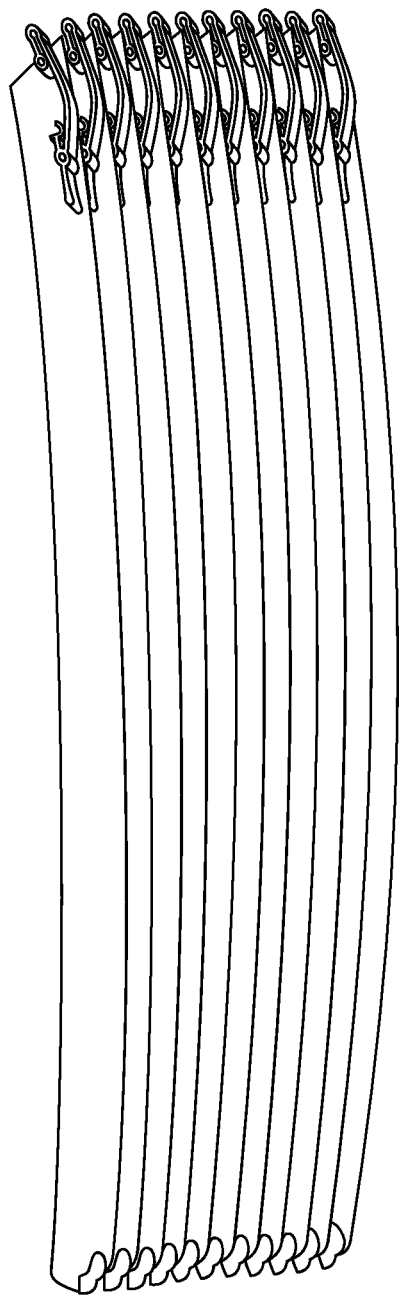

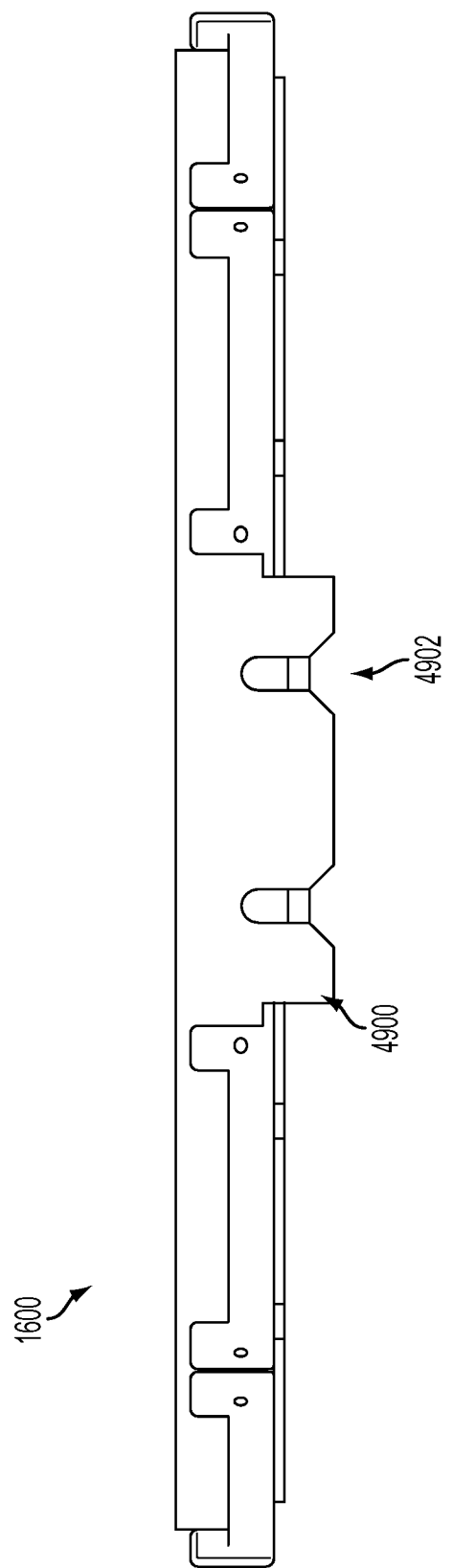

PORTABLE SATELLITE COMMUNICATION SYSTEM

CROSS REFERENCE TO RELATED APPLICATIONS

This application is a non-provisional patent application claiming the benefit of U.S. Patent Application No. 61/609,307 filed on Mar. 10, 2012, the entirety which is incorporated herein by reference.

BACKGROUND OF THE INVENTION

1. Statement of the Technical Field

The inventive arrangements relate to portable satellite communication systems, and more particularly to transportable quick-erect antenna systems therefore.

2. Description of the Related Art

Portable satellite communication antennas must be rigid, lightweight, offer compact stowage, and facilitate ease of transport. These systems must also facilitate rapid set-up with limited tooling and minimal effort. Once assembled, the antenna system must provide excellent performance. The system must meet all Radio Frequency ("RF") and electrical requirements while also providing good mechanical stability and platform rigidity. Satisfying all of these competing demands is challenging and many conventional systems achieve some of these goals while sacrificing others. A complete antenna system that satisfies all of the design goals requires careful consideration and innovation applied to each component of the system.

SUMMARY OF THE INVENTION

Embodiments of the present invention concern satellite communication systems. Each satellite communication system comprises a Parabolic Segmented Antenna ("PSA") reflector with a plurality of identical panels that are interchangeable. The panels can be compactly stored in a nested stacked arrangement. Each of the panels has a trapezoid shape with a concave cross-sectional profile and angled sidewalls. Each panel may also comprise stamped metal or composite with no core, a honeycomb core, or a foam core. Adjacent ones of the plurality of identical panels are fastened at first ends to each other via panel-to-panel latching mechanisms. The panel-to-panel latching mechanism can comprise a draw latch, spring latch, or a captive wing-nut threaded stud which locks to a forked clevis bracket. The panel-to-panel latching mechanisms have form factors and positions on the panels that ensure the panel-to-panel latching mechanisms will not interfere with the nested arrangement. Each of the plurality of identical panels is mounted on a center hub.

According to first aspects of the present invention, the center hub comprises a plurality of insert spaces formed along a peripheral sidewall thereof and a plurality of engagement members protruding into the plurality of insert spaces. Each panel comprises a tab that is sized and shaped to be inserted into a respective insert space of the plurality of insert spaces. The respective insert space has a chamfered sidewall to allow the tab to be inserted therein at an angle relative to a center axis of the respective insert space. The tab has at least one aperture formed therein that engages a respective one of the engagement members when the orientation of the tab is transitioned from an angled orientation relative to the center axis to a generally parallel orientation relative to the center axis. In this scenario, each engagement member can comprise, but is not limited to, a set screw with a conical or spherical end. The screw depth of the set screws can be adjusted to control the angle of the panel to the hub for each individual panel so as to maintain the correct orientation of the panel's continuous slope. Using two set screws allows up/down panel slope adjustments and some clockwise/counterclockwise twist adjustments.

According to second aspects of the present invention, the center hub comprises a groove formed in a peripheral portion thereof and a plurality of panel engagement members protruding into the groove. Each panel comprises a sidewall with at least one dimple molded therein that forms the panel engagement member. The dimple is caused to engage the respective engagement member when the panels are latched together. In contrast, the dimple is caused to disengage the respective engagement member when the panels are unlatched from each other. When assembled, the sidewall of each panel is retained in the groove as a result of (a) an engagement of the dimple to the respective engagement member, and (b) frictional contact between the sidewall and a surface of the center hub.

According to third aspects of the present invention, reflector wind moment loads are transferred to a positioner structure via a base panel. In some scenarios, the base panel comprises a tab which is clamped within an insert space of a center hub via a securing member. The securing member comprises a draw screw with a cam draw lever attached thereto. In other scenarios, the base panel is absent of such a tab, but comprises a push/pull toggle clamp for clamping the base panel to a center hub.

According to fourth aspects of the present invention, each panel-to-panel latching mechanism comprises a draw latch pivotally coupled to a first adjacent panel and an engagement member coupled to a second adjacent panel. In some scenarios, the draw latch comprises a catch member configured to snappingly engage the engagement member. The draw latch comprises a plurality of circular spring flexure joints and a cantilever arm to guide the catch member to the engagement member. The cantilever arm can have an arched profile, a straight profile or a generally "Z" shaped profile. The draw latch further comprises a release tab protruding out and away from one of the plurality of circular spring flexure joints. The release tab is configured to facilitate a disengagement of the catch member from the engagement member.

According to fifth aspects of the present invention, the satellite communication system also comprises a plurality of interchangeable feedhorn assemblies which operate at a plurality of different frequencies. Each feedhorn assembly comprises a shaft having a feedhorn disposed at a first end thereof and a feed flange disposed at a second end thereof. The feed flange is configured to facilitate a coupling of the shaft to a center hub. In this regard, the feed flange is sized and shaped to snuggly fit within a socket attached to or integrally formed with the center hub.

A plurality of levers are pivotally mounted to the feed flange for facilitating a secure coupling of a feedhorn assembly to a center hub. Each lever comprises an arm to enable rotation thereof relative to the feed flange. The arm contacts the shaft when the lever is in its closed position so as to provide structural support to the feedhorn assembly. In this regard, each lever comprises a beveled cam surface to engage a beveled cam groove formed in a sidewall of a socket attached to or integrally formed with the center hub. A camming engagement of the beveled cam surface and the beveled cam groove creates high contact forces between the feed flange and the socket for carrying cantilevered bending moment loads.

According to sixth aspects of the present invention, a structure for controlling transmit and receive polarization of free space RF radiation is provided. This structure may be implemented by the feed flange and center hub. For example, the feed flange can have a plurality of indentations formed in a peripheral edge thereof. The center hub can have a pin mounted thereto. In this scenario, an angular orientation of an antenna feed relative to the center hub is adjusted by removing the horn and re-inserting with a new polarization notch or scallop.

According to seventh aspects of the present invention, the satellite communication system further comprises a tripod positioning structure to which the PSA reflector is mounted via a blind mate dove tail mounting mechanism. A first mating portion of the blind mate dove tail mounting mechanism is mounted an a base panel of the plurality of identical panels. A second mating portion of the blind mate dove tail mounting mechanism is coupled to or integrally formed with the tripod positioning structure. The first and second mating portions are configured such that an interference fit therebetween can be created by a screw drive that provides a rigid connection between the base panel and the tripod positioning structure. The rigid connection is configured to resist applied moments and linear displacement of the base panel and the tripod positioning structure.

In an eighth aspect of the present invention, the tripod positioning structure comprises a hub, a stationary leg and a plurality of folding legs pivotally attached to the hub. The folding legs are nested within the stationary leg when stowed. The stationary leg comprises an internal cavity in which other components of the satellite communication system can be stored. The folding legs are coupled to the hub via hinges. Hard stops are provided against which the folding legs can be preloaded.

According to ninth aspects of the present invention, the satellite communication system includes a satellite communication transceiver unit comprising RF circuitry. A mounting structure configured to facilitate removable mounting of the satellite communication transceiver is provided on an antenna element. One of a male mating portion and a female mating portion is disposed on the satellite communication transceiver unit and forms a terminal end of a waveguide RF antenna port for the satellite communication transceiver unit. One of the male mating portion and the female mating portion is also disposed on a terminal end of the waveguide antenna feed, and oppositely sexed as compared to the mating portion provided on the satellite communication transceiver unit. A partial spherical female surface is defined on the female mating portion configured to engage a partial spherical male surface defined on the male mating portion. The female mating portion and the male mating portion together form a ball socket swivel when the satellite communication transceiver unit is mounted in the mounting structure, and the male and female mating portion are mated together.

The present invention also concerns a method for providing an RF interface between a waveguide antenna feed of a satellite communication antenna and a waveguide RF antenna port of a satellite communication transceiver unit. The method involves providing the waveguide RF antenna port with one of a male and a female mating portion. The waveguide antenna feed is provided with one of the male and the female mating portions, oppositely sexed as compared to the mating portion on the waveguide RF antenna port. Thereafter, the method continues by positioning a housing enclosing the satellite communication transceiver unit on a mounting structure disposed on an antenna element of the satellite communication antenna. A blind mating operation is performed which includes inserting a partial spherical male surface of the male mating portion within a partial spherical female surface of the female mating portion.

The present invention further concerns a method for communicating RF energy across a waveguide interface. This method involves disposing a female mating portion at a terminal end of a first waveguide and disposing a male mating portion at a terminal end of a second waveguide. A partial spherical male surface is provided on the male mating portion and a partial spherical female surface is provided on the female mating portion. A ball and socket swivel is formed by receiving the partial spherical male surface within a portion of the female mating portion defined by the partial spherical female surface. RF energy is subsequently communicated between the first waveguide and the second waveguide, through the male and female mating portions.

BRIEF DESCRIPTION OF THE DRAWINGS

Embodiments will be described with reference to the following drawing figures, in which like numerals represent like items throughout the figures, and in which:

FIG. 24 is a schematic illustration of a plurality of stacked panels employing the latching mechanism of FIGS. 23A-23C.

FIG. 49C is a side view of the center hub shown in FIG. 49A.

DETAILED DESCRIPTION

Figure 1:
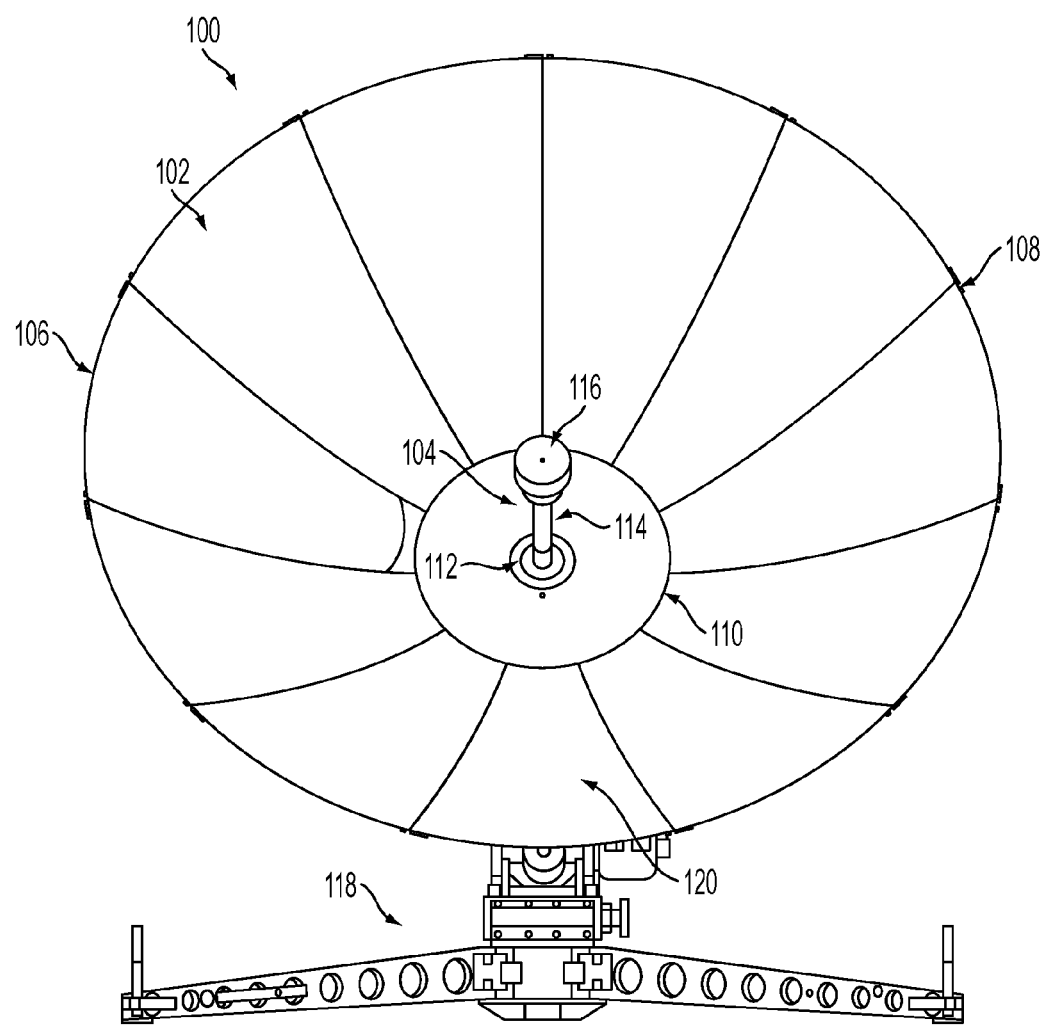
FIG. 1 is a front view of an exemplary Portable Satellite Communication Antenna ("PSCA") assembly in its fully assembled state.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Embodiments of the present invention generally concern a Portable Satellite Communication Antenna ("PSCA") assembly. The PSCA assembly comprises a relatively large antenna that can be stored in a single relatively small case and assembled/disassembled quickly. All parts of the PSCA assembly fold and hinge to a central assembly, and have no loose parts that can be lost or stepped on. The PSCA assembly is lightweight, stiff and rugged. The PSCA assembly has a low center of gravity and wind tipping performance. The PSCA assembly has N−1 interchangeable panels, a base panel and a transmitter/receiver assembly integration directly to the back of an antenna, where N is an integer. The base panel is unique for attaching to a positioner using a dovetail joint.

During operation, the antenna is used with an electronic communication unit for transmitting and receiving data via a communications satellite, an Unmanned Ground Vehicle ("UAV"), terrestrial point-to-point link, or troposcatter link. The communications satellite may be positioned in space for the purpose of telecommunications, broadcasting and mobile communications. In some embodiments, the communication satellite provides fixed (point-to-point) services. Fixed (point-to-point) services are well known in the art, and therefore will not be described herein.

A front view of an exemplary PSCA assembly 100 in its fully assembled state is provided in FIG. 1. A back perspective view of the PSCA assembly 100 in its fully assembled state is provided in FIG. 2. A schematic illustration of the PSCA assembly 100 in its fully disassembled state is provided in FIG. 3. A schematic illustration of the PSCA assembly 100 disassembled and disposed in a case is provided in FIG. 4. The PSCA assembly 100 is designed such that it can be easily and quickly transported, assembled and disassembled by a user thereof. The easy and quick assembly/disassembly is facilitated by various novel features of the PSCA assembly 100. These novel features will become evident as the discussion progresses.

Figure 4:
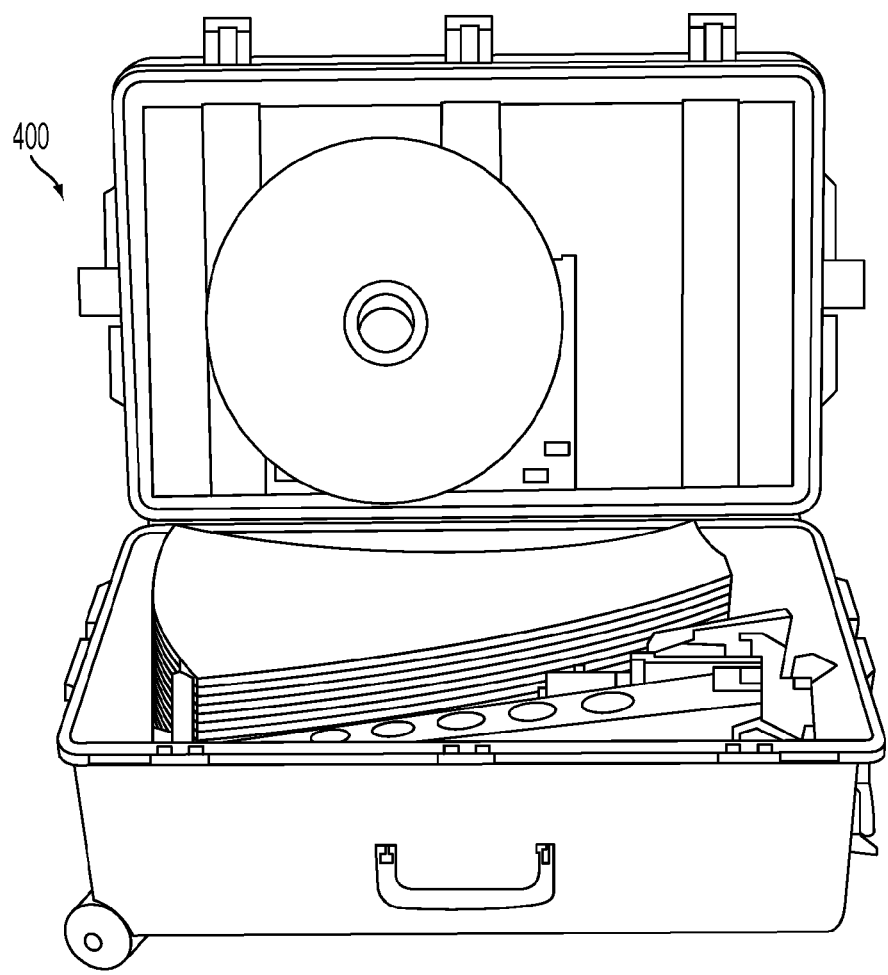
FIG. 4 is a schematic illustration of the PSCA assembly of FIG. 1 disassembled and stored in an exemplary case.

As shown in FIG. 1, the PSCA assembly 100 comprises a Parabolic Segmented Antenna ("PSA") reflector 102. The parabolic shape of the PSA reflector 102 reflects signals received from the communications satellite to the dish's focal point. PSA reflector 102 includes a plurality of panels 106. The panels are designed such that they can be stored in a relatively small volume, such as in a case 400 that satisfies the size limitations for carry-on luggage in a commercial airliner as shown in FIG. 4. The panels will be described further below in the section entitled "Reflector Panels". Notably, the panels 106 have the same or substantially similar shape such that they are interchangeable. The panels 106 are also designed such that they require a relatively low tooling cost.

During assembly, the panels 106 are fastened to each other via latching mechanisms 108. Each of the panels 106 is also mounted on a center hub 110 via a locking mechanism (not shown in FIG. 1). The locking mechanisms and latching mechanisms 108 will be described in detail below in the sections entitled "Panel-to-Hub Locking Mechanisms" and "Panel-to-Panel Latching Mechanisms", respectively. However, it should be understood that these mechanisms facilitate the disassembly of the PCSA assembly 100 for compact storage and transport.

A feedhorn assembly 104 is mounted on the PSA reflector 102. The feedhorn assembly 104 comprises a shaft 114 and a feedhorn 116. The shaft 114 supports the feedhorn 116 such that the phase center of the feedhorn 116 is placed at the focal point of the PSA reflector 102. The shaft 114 is advantageously attached to the center hub 110 via quick-connect mechanisms 112. The quick-connect mechanisms 112 allow the feedhorn assembly 104 to be detached from the PSA reflector 102 for disassembly and transport of the PSCA assembly 100. The quick-connect mechanisms 112 also allow the feedhorn assembly 104 to be replaced with another feedhorn assembly which operates at a different frequency than that thereof. Accordingly, the PSCA assembly 100 comprises interchangeable feedhorn assemblies to allow the communication unit to communicate with communication satellites at a plurality of different operating frequencies. The interchangeable feedhorn assemblies facilitate the control of the polarization of free space RF radiation, which is related to the orientation of the feed. The quick connect mechanisms 112 will be described in detail below in the section entitled "Feedhorn-to-Hub Quick Connect Mechanism". Still, it should be understood that the feed horn may comprises a male blind mate that acts as centering feature for RF transceiver which is allows some tilt and movement.

The PSA reflector 102 is coupled to a tripod positioning structure 118 via a mounting mechanism (not shown in FIG. 1). The mounting mechanism will be described in detail below in the section entitled "Reflector-to-Tripod Mounting Mechanism". The tripod positioning structure 118 provides a stiff mounting platform to mount an antenna such that the antenna can be pointed at a communication satellite without pointing loss in high wind conditions. The tripod positioning structure 118 is configured to be transitioned from its fully deployed position shown in FIG. 1 to a stowed position which allows for compact storage of the PSCA assembly 100. The tripod positioning structure 118 will be described below in the section entitled "Tripod Positioning Structure".

Figure 2:
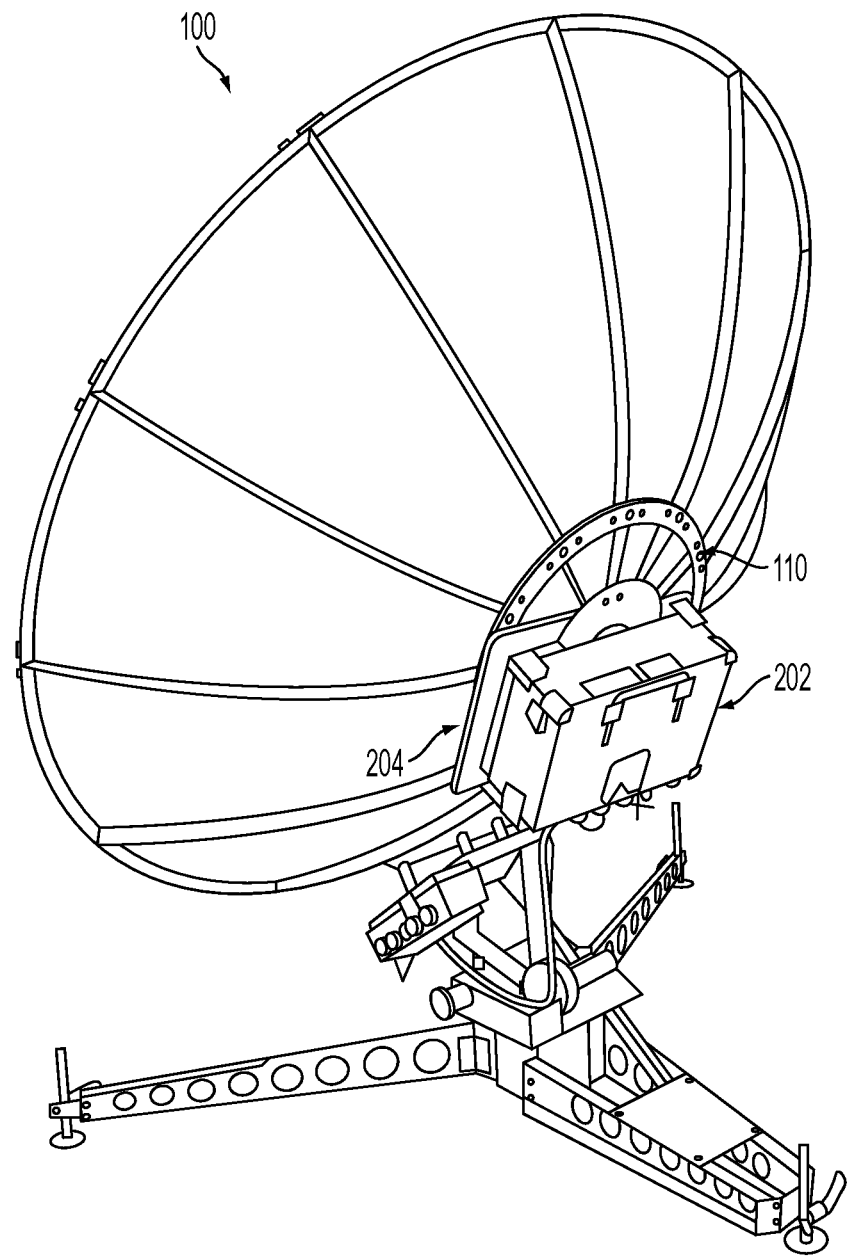
FIG. 2 is a back perspective view of the PSCA assembly shown in FIG. 1 in its fully assembled state including a mated transmit/receive RF unit.
Figure 3:
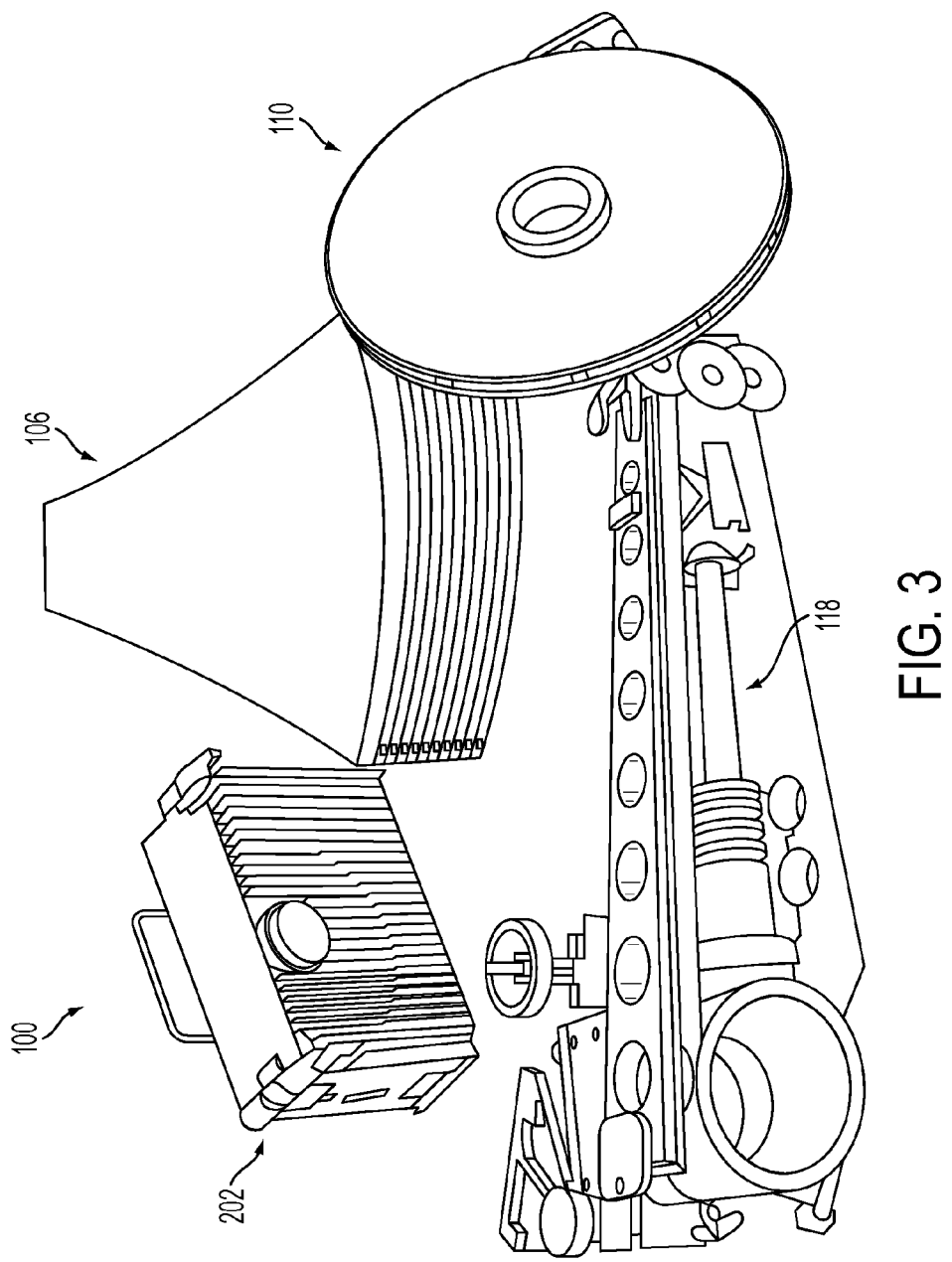
FIG. 3 is a schematic illustration of the PSCA assembly shown in FIG. 1 in its fully disassembled state.

As shown in FIG. 2, the electronic communication unit 202 is coupled to the center hub 110 via a coupling mechanism. The coupling mechanism facilitates the relatively easy blind mating and de-mating between the feedhorn assembly 104 and the corresponding RF electronics of the electronic communication unit 202, without hardware or visual verification of the assembly. The coupling mechanism will be described further below in the section entitled "Electronic-to-Hub Coupling Mechanism". Still, it should be understood that in some scenarios the electronic communication unit 202 is coupled to the PSA reflector 102 via draw latches (not shown) and/or brackets (not shown). The brackets may be disposed on a housing of the electronic communication unit 202. The brackets are sized and shaped for insertion into apertures (not shown) formed in a plate 204 coupled to a rear surface of the center hub 110. This configuration allows the electronic communication unit 202 to hang from the PSA reflector 102 by lowering the brackets into the apertures formed through plate 204.

Nesting Reflector Panels

Figure 5:
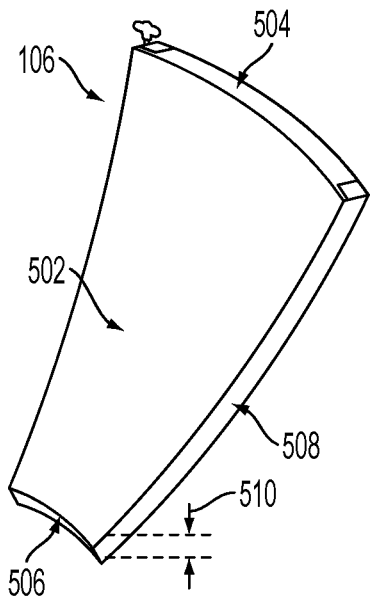
FIG. 5 is a front perspective view of a panel shown in FIG. 1.

Referring now to FIG. 5, there is provided a front perspective view of a panel 106. The panel 106 has a generally trapezoidal shape with a concave cross-sectional profile. The panel 106 comprise stamped metal or composite with no core, a honeycomb core, or a foam core (not shown). The honeycomb core and/or foam core help maintain the trapezoidal shape thereof under wind pressure and other types of loading. The honeycomb or foam core also ensures that the total weight of the panel 106 is minimized.

Figure 6:
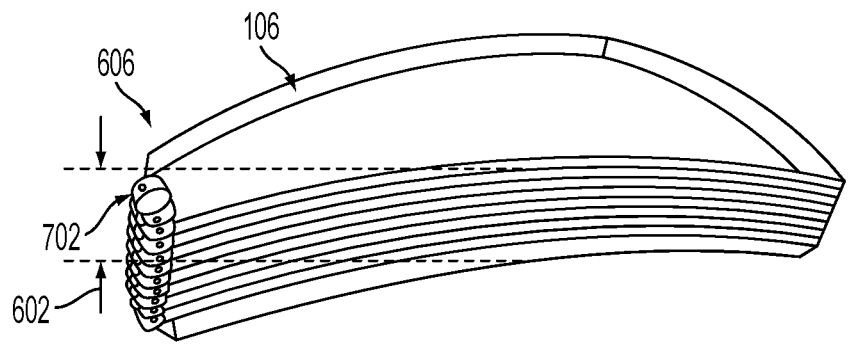
FIG. 6 is a perspective view of the panels of FIG. 1 in a nested stacked arrangement.

As noted above, the panels 106 are designed such that they can be stored in a relatively small volume, such as in a case 400 that satisfies the size limitations for carry-on luggage in a commercial airliner as shown in FIG. 4. In this regard, the panels 106 are sized and shaped to be stacked together as shown in FIG. 6. In the stacked arrangement, each panel 106 fits within the panel that is directly below it, and thereby provides a nested stacked arrangement. The nested stacked arrangement allows the panels to be transported as a group without requiring a back or special case therefore. The nested stacked arrangement also ensures that the panels 106 are locked in position relative to each other so that they can be transported or shipped without damage thereto.

The nested stacked arrangement is achieved by designing the panels with a thin curved body 502 and angled sidewalls 504, 506, 508. The sidewalls 504, 506, 508 have a relatively small height 510 selected for enabling compact storage thereof. For example, the height 510 is selected to be one inch. The angle of the sidewalls 504, 506, 508 is selected to have a value that provides a relatively small vertical stacked panel-to-panel spacing (e.g., a quarter of an inch).

The nested stacked arrangement further ensures that a total height 602 of a stacked set of panels is minimized. In this regard, it should be understood that the total height of a stacked set of conventional panels is approximately equal to the sum of each panel's thickness multiplied by the total number of panels, plus the curvature of the panel. Typically, eleven conventional panels are employed which each have a curvature of two inches and a thickness of three-fourth inch. In this scenario, the total height of the stacked conventional panels is approximately equal to ten and a fourth inch. In contrast, a stack of eleven panels 106 for the same sized antenna has a total height 602 of approximately six inches. As such, the present invention has a total stack height 602 which is substantially reduced as compared to that of a stack of conventional PSA reflectors. The reduced height 602 allows the center hub 110 to be carried in the same case as the panels 106.

Figure 7:
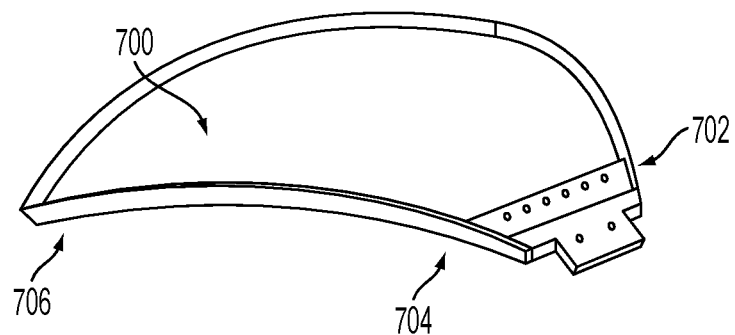
FIG. 7 is a rear perspective view of an exemplary panel having a male component disposed at a proximal end thereof.
Figure 8:
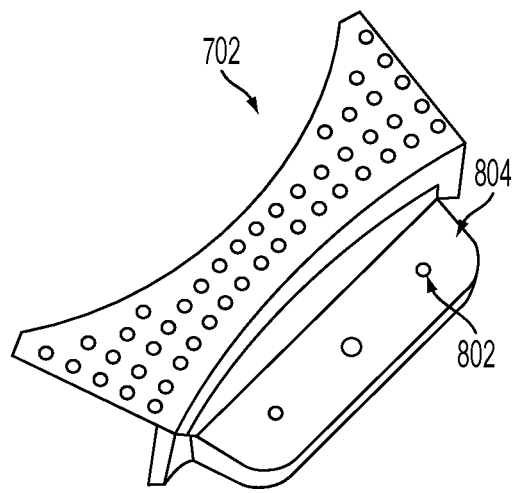
FIG. 8 is a rear perspective view of the male component shown in FIG. 7.
Figure 15:
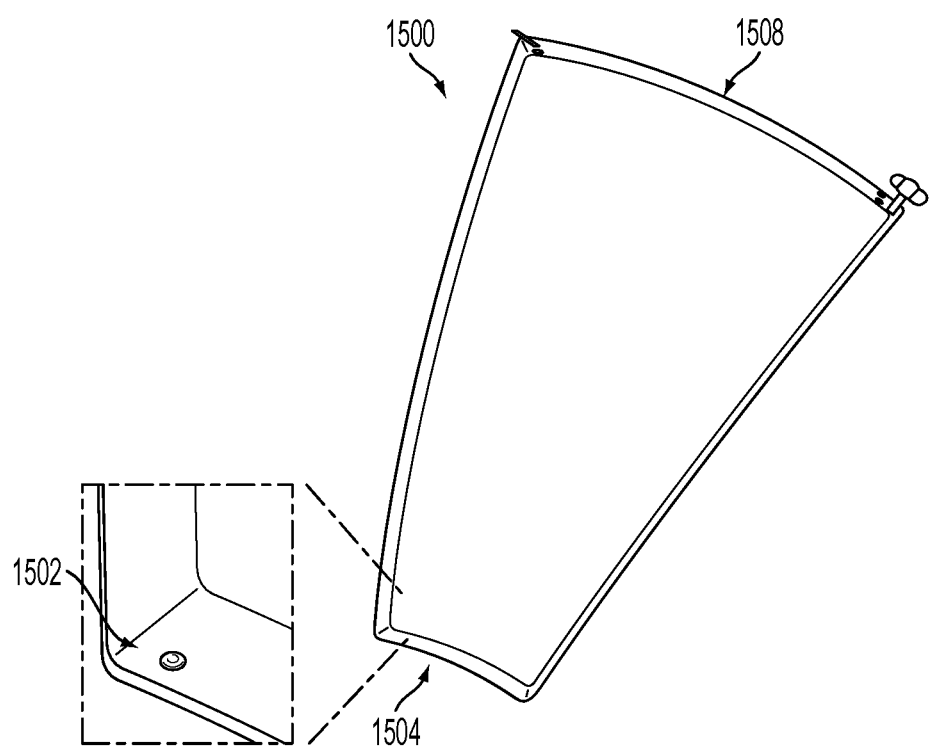
FIG. 15 is a front perspective view of an exemplary panel having a female component of a locking post mechanism disposed at a proximal end thereof.

As shown in FIGS. 6-8, the panels 106 may each have a male component (or tab) 604 coupled to an end 606 thereof. The male component (or tab) 604 is provided for facilitating the coupling of the panels 106 to the center hub 110, as will be described below. Embodiments of the present invention are not limited in this regard. For example, the panels may be absent of the male components (or tabs) 702. FIG. 15 shows an exemplary architecture of such a panel 1500 absent of a tab. As shown in FIG. 15, the panel 1500 has at least one female dimple 1502 molded directly into the sidewall 1504 thereof for facilitating the coupling of the panel to a center hub. Elimination of the male component (or tab) 604 reduces cost and weight of the PSA reflector. Also, the manufacturing of the hub retention features is simpler and easier to machine.

Panel-to-Hub Locking Mechanisms

As noted above, the panels 106 are coupled to the center hub 110 via locking mechanisms. The locking mechanisms are configured such that the panels 106 can be securely coupled to the center hub 110 during use of the PSA reflector 102, but allow the PSA reflector 102 to be easily and quickly disassembled. As such, the locking mechanisms can include, but are not limited to, locking tab mechanisms, locking post mechanisms, a moment carrying joint mechanism, or a push/pull toggle clamping mechanism. Each of these mechanisms will be addressed separately below. Still, it should be noted that one or more of the different types of panel-to-hub locking mechanisms can be employed in a single PSCA assembly 100.

Locking Tab Mechanisms

Figure 9:
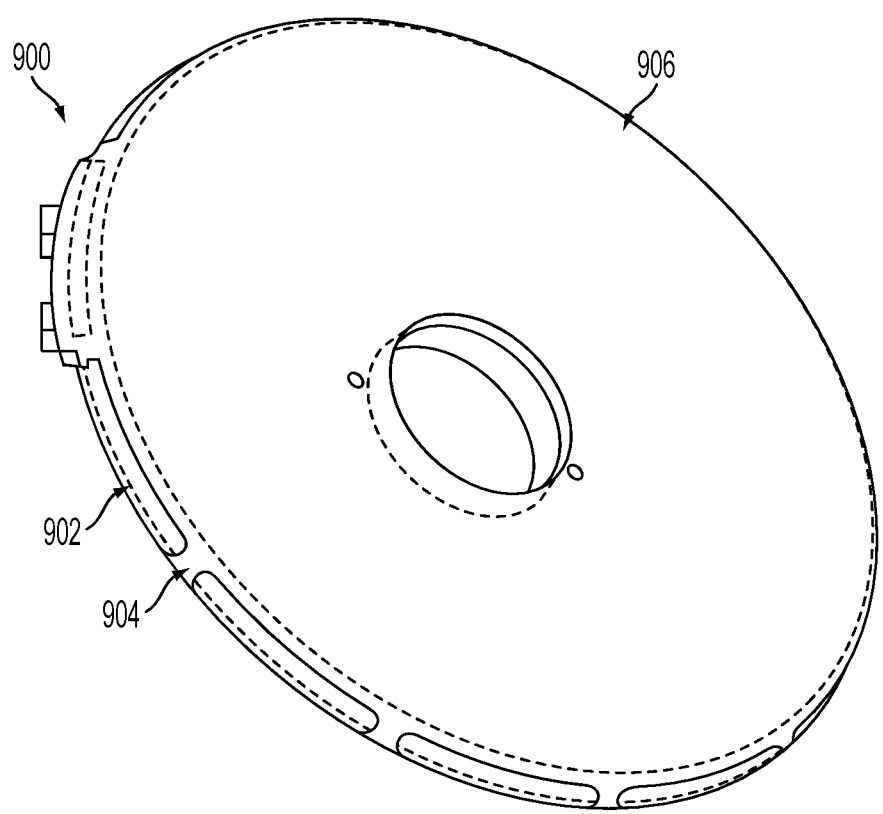
FIG. 9 is a perspective view of an exemplary center panel having a plurality of female components integrally formed therewith.
Figure 10A:
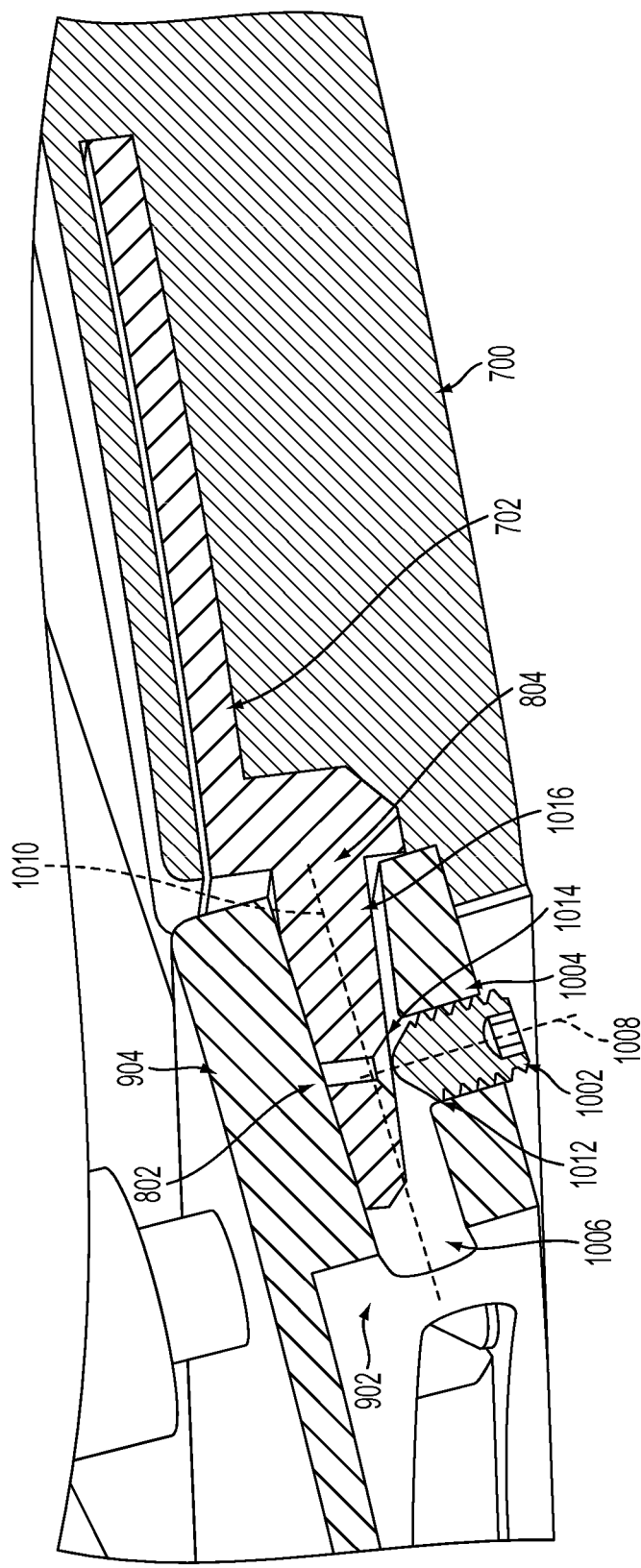
FIGS. 10A-10B provide schematic illustrations that are useful for understanding the mechanical operations of the male/female components for coupling the panel of FIGS. 7-8 to the center hub of FIG. 9.
Figure 10B:
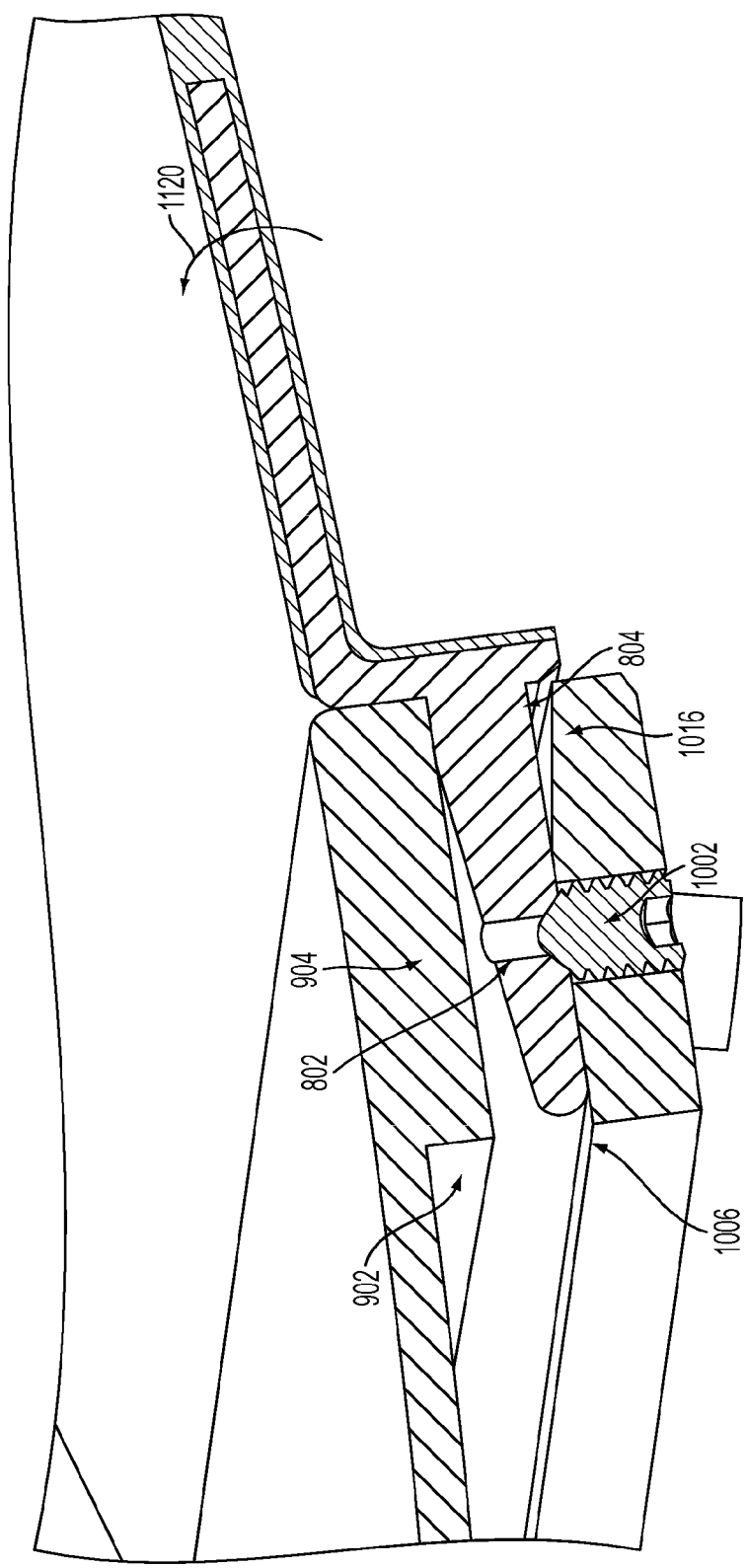

A locking tab mechanism generally includes a male component and a female component in which the male component can be inserted and retained. A panel is coupled to a center hub when the male component is inserted into the female component. In some embodiments, the male component is disposed on the center hub and the female component is provided on the panel. In other embodiments, the male component is disposed on the panel and the female component is provided on the center hub. Schematic illustrations which are useful for understanding the later embodiments are provided in FIGS. 7-10B. FIG. 7 provides a rear perspective view of an exemplary panel 700 having a male component 702 disposed at a proximal end 704 thereof. FIG. 8 provides a rear perspective view of the male component 702. FIG. 9 provides a perspective view of an exemplary center panel 900 having a plurality of female components 902 integrally formed therewith. FIGS. 10A-10B provide schematic illustrations that are useful for understanding the mechanical operations of the male/female components 702, 902 for coupling the panel 700 to the center hub 900.

As shown in FIGS. 7-10B, the center hub 900 comprises a planar body 906 having a peripheral sidewall 904 protruding out and away therefrom. A plurality of female components 902 are formed along the sidewall 904. Each female component 902 comprises an elongate insert space 1006 formed through the sidewall 904 that is sized and shaped to receive at least a portion of a male component 702 disposed on a panel 700. During insertion, the male component 702 is in its relaxed orientation as shown in FIG. 10A. The relaxed orientation permits an engagement portion 804 of the male component 702 to be inserted into the insert space 1006 of the female component 902 without interference from other components of the PSCA assembly 100.

The male component 702 has a plurality of countersink holes 802 formed through the engagement portion 804 thereof. Each of the countersink holes 802 is provided for receiving a portion of a set screw 1002 such that the panel 700 can be securely coupled to the center hub 900, as shown in FIG. 10B. The set screw 1002 is disposed within a threaded through hole 1004 formed in the sidewall 904 of the center hub 900. A central axis 1008 of the threaded through hole 1004 is generally perpendicular to a center axis 1010 of the insert space 1006. The set screw 1002 has a conical or spherical end 1012 for engaging a sidewall surface 1014 of the countersink hole 802. In this regard, it should be understood that the position of the set screw 1002 relative to the center axis 1010 of the insert space 1006 can be adjusted such that: the engagement portion 804 can be inserted into the insert space 1006 in its relaxed orientation, without interference from the set screw 1002 as shown in FIG. 10A; and the engagement portion 804 can be securely retained in the insert space 1006 after being placed in its engaged orientation as shown in FIG. 10B. The manner in which the engagement portion 804 is transitioned from its relaxed orientation (shown in FIG. 10A) to its engaged orientation (shown in FIG. 10B) will become evident as the discussion progresses.

Notably, no tools are required for securing the engagement portion 804 in the insert space 1006. In this regard, it should be understood that the insert space 1006 is defined by a chamfered sidewall 1016. The chamfered sidewall 1016 allows the engagement portion 804 to be inserted into the insert space 1006 at an angle relative to a center axis 1010 thereof. Consequently, the engagement portion 804 may be inserted into the insert space 1006 in its relaxed orientation, without interference from the set screw 1002 which may be protruding into the insert space 1006 as shown in FIG. 10A. Also, the engagement portion 804 can be disengaged from the set screw 1002 is an easy, quick and toolless manner.

Figure 11:
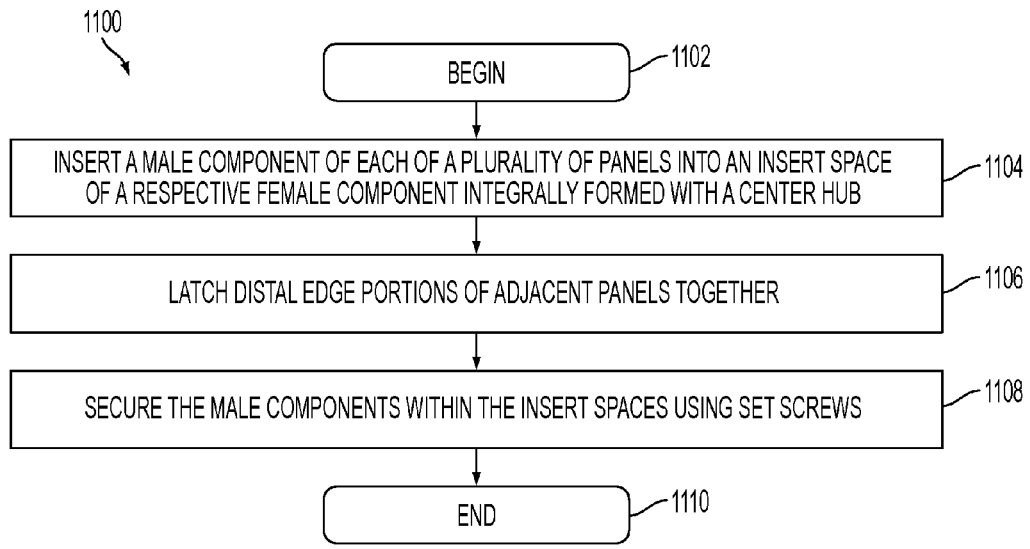
FIG. 11 is a flow diagram of an exemplary method for coupling a plurality of panels to a center hub using latching tab mechanisms.
Figure 12:
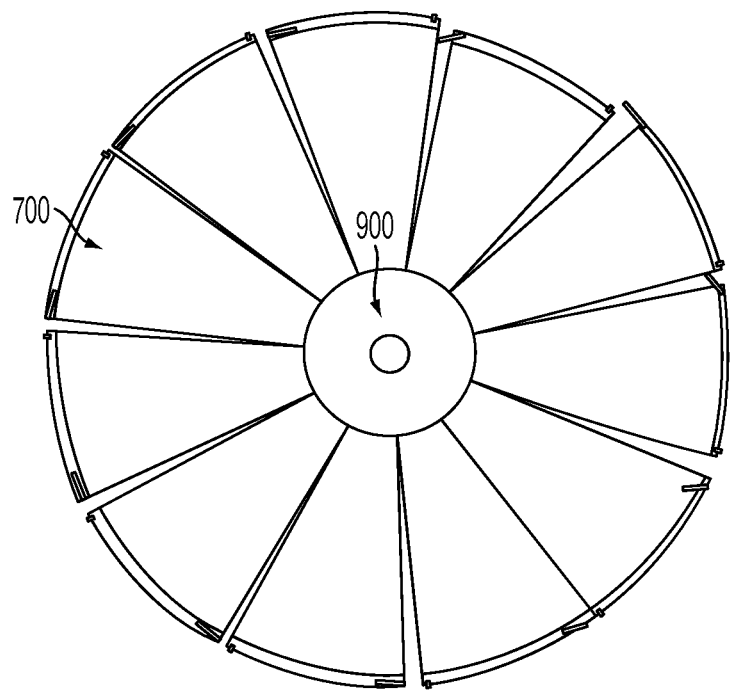
FIG. 12 is a schematic illustration of a plurality of panels in their rest orientations.

Referring now to FIG. 11, there is provided a flow diagram of an exemplary method 1100 for coupling a plurality of panels 700 to the center hub 900 using latching tab mechanisms. As shown in FIG. 11, the method 1100 begins with step 1102 and continues with step 1104. In step 1104, a male component 702 of each of a plurality of panels 700 is inserted into an insert space 1006 of a respective female component 902 integrally formed with a center hub 900. In effect, each of the panels 700 are in their rest positions as shown in FIG. 10B. A schematic illustration of a plurality of panels 700 in their rest positions is provided in FIG. 12.

Figure 13:
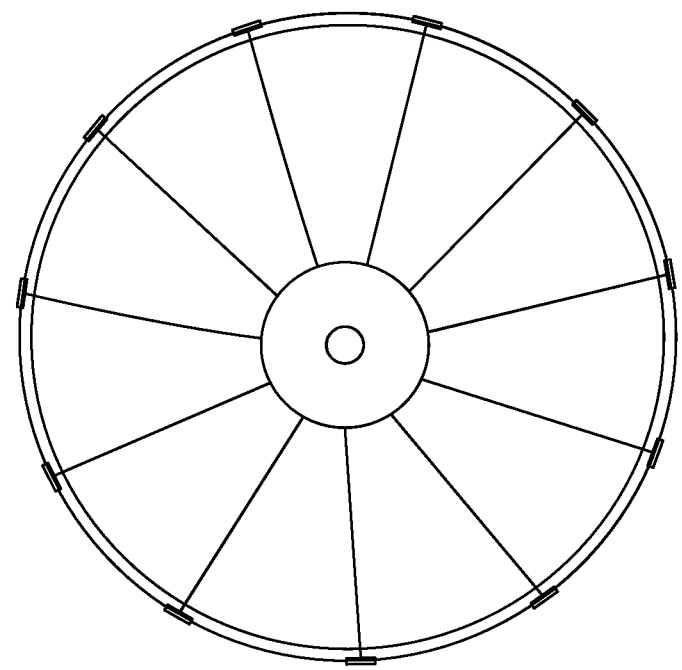
FIG. 13 is a schematic illustration of a plurality of panels in their engaged orientations.

Upon completing step 1104, the method 1100 continues with step 1106. Step 1106 involves latching distal edge portions 706 of the adjacent panels 700 together. The adjacent panels can be latched together using panel-to-panel latching mechanisms. Exemplary panel-to-panel latching mechanisms are described below. As a result of the latching, the panels 700 are drawn toward each other as depicted in FIG. 13, which causes the panels 700 to rotate in a counterclockwise direction as denoted by the arrow 1120 of FIG. 10B. As a consequence of this rotation, the panels 700 are transitioned from their relaxed orientations to their engaged orientations. Once the panels 700 are in their engaged orientations, the male components 702 thereof are secured within the respective insert spaces 1006, as shown by step 1108. In this regard, it should be understood that the rotational movement of the panels causes set screws 1102 to become disposed within respective countersink holes 802 of the male components 800. Subsequently, step 1110 is performed where the method 1100 ends.

Figure 14:
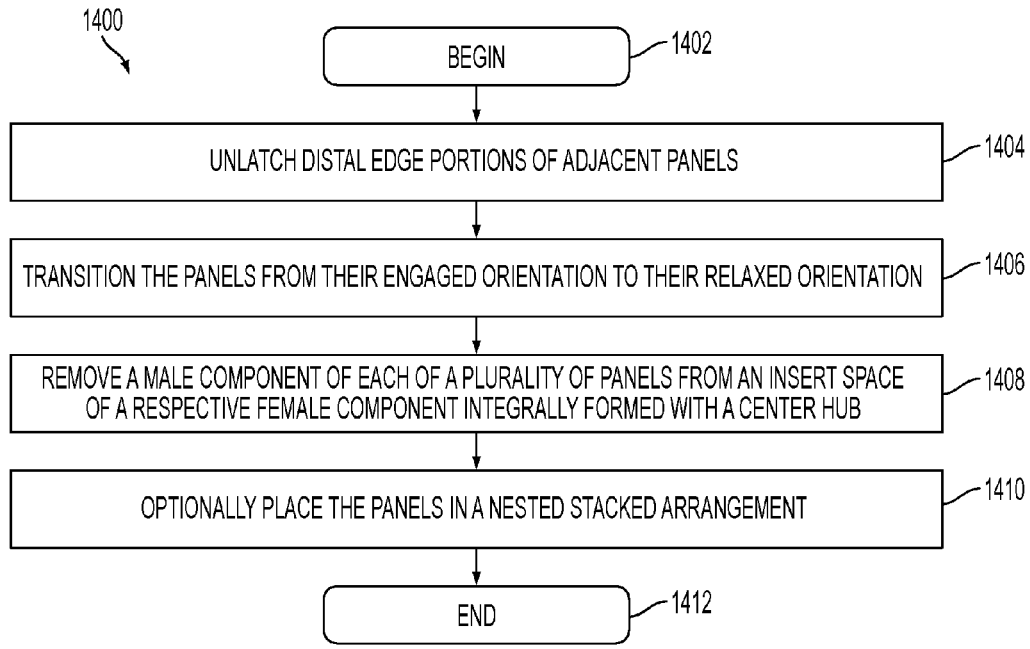
FIG. 14 is a flow diagram of an exemplary method for decoupling a plurality of panels from a center hub employing latching tab mechanisms.

Referring now to FIG. 14, there is provided a flow diagram of an exemplary method 1100 for decoupling a plurality of panels 700 from the center hub 900 employing latching tab mechanisms. As shown in FIG. 14, the method 1400 begins with step 1402 and continues with step 1404. In step 1404, distal edge portions of adjacent panels 700 are unlatched. In some embodiments, the panels 700 are latched together using panel-to-panel latching mechanisms. The manner in which the panel-to-panel latching mechanisms are unlatched will be discussed below. As a consequence of the unlatching, gravity causes the panels 700 to move away from each other, which causes the panels 700 to rotate in the clockwise direction. In turn, the panels 700 are transitioned from their engaged orientations (shown in FIG. 10B) to their relaxed orientations (shown in FIG. 10A), as shown by step 1406.

Next in step 1408, a male component 702 of each panel 700 is removed from an insert space 1006 of a respective female component 902 integrally formed with a center hub 900. Thereafter, optional step 1410 can be performed to place the panels in a nested stacked arrangement (such as that shown in FIG. 6). Notably, the male components 702 are designed such that they do not interfere with a compact panel-to-panel nested stacking arrangement for storage. Subsequent to completing step 1408 or optional step 1410, step 1412 is performed where the method 1400 ends.

Locking Post Mechanisms

Figure 16:
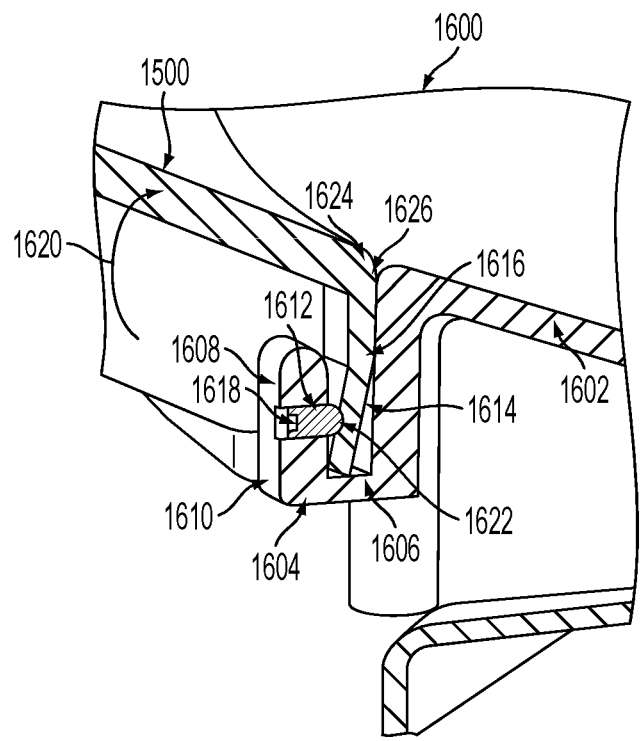
FIG. 16 is a partial cut away view that is useful for understanding how the panel of FIG. 15 can be coupled to an exemplary center hub via a corresponding male component of a locking post mechanism.
Figure 17:
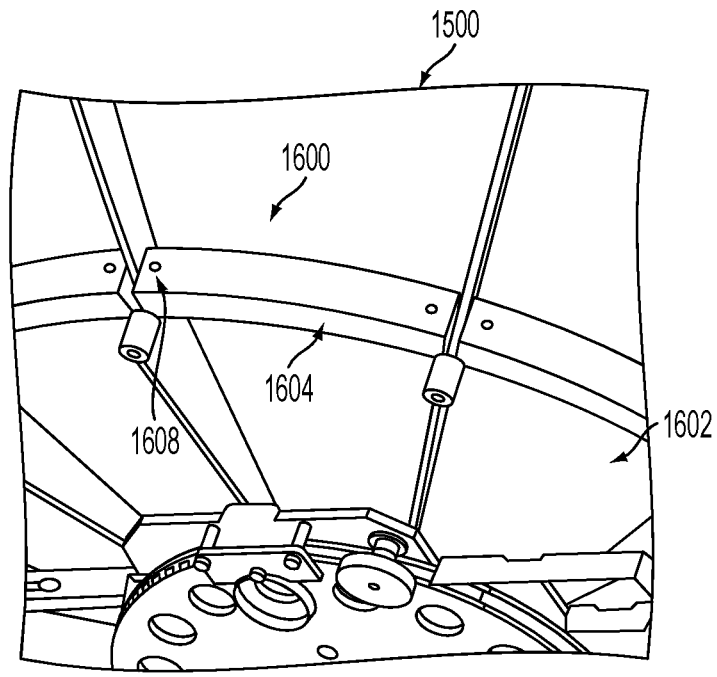
FIG. 17 is a rear perspective view of a plurality of panels coupled to the center hub of FIG. 16.
Figure 49A:
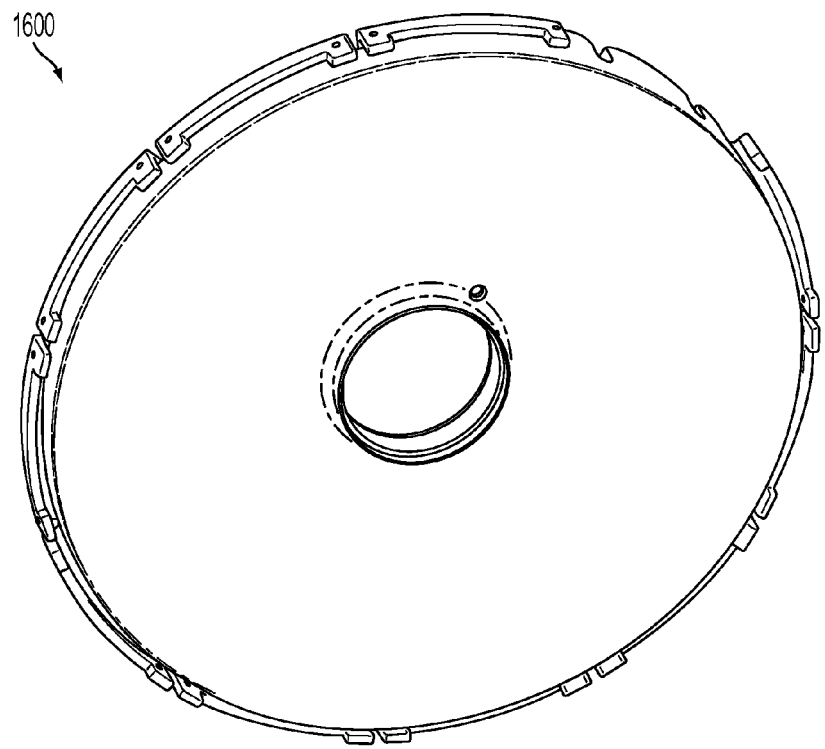
FIG. 49A is a top perspective view of an exemplary center hub shown in FIG. 16.
Figure 49B:
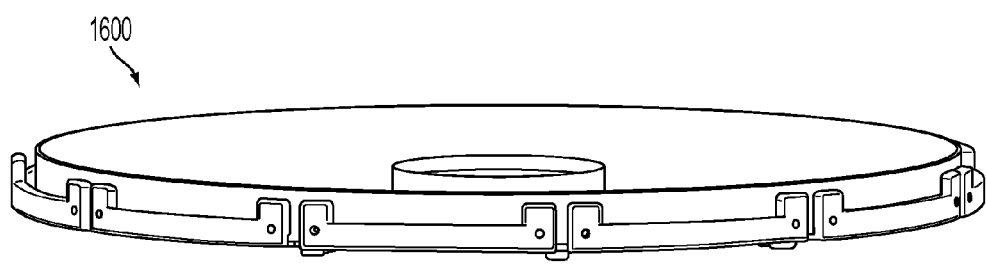
FIG. 49B is a perspective side view of the center hub shown in FIG. 49A.
Figure 50:
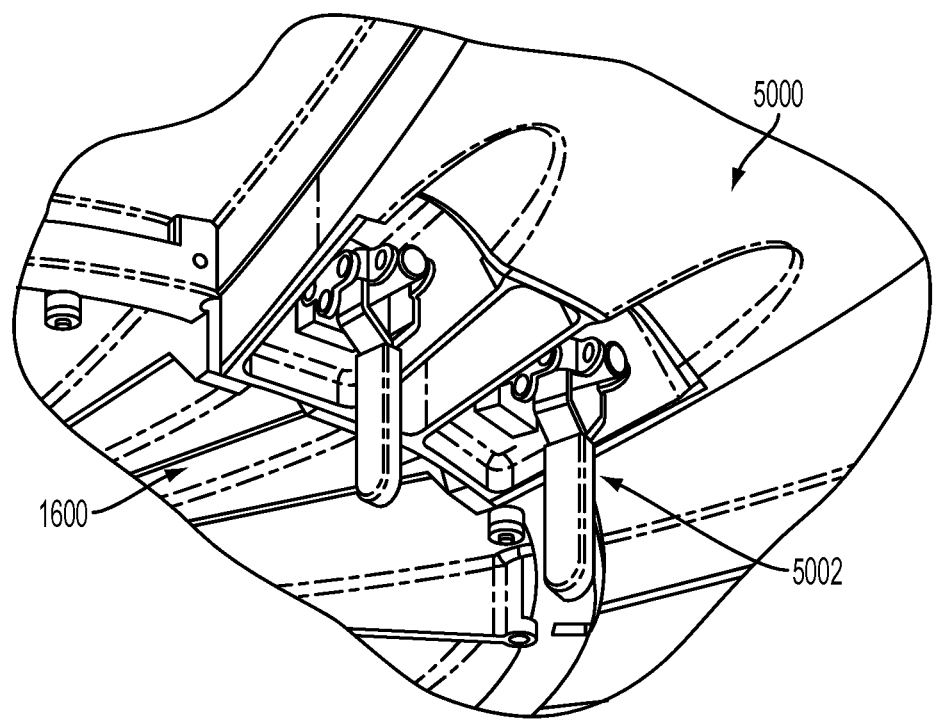
FIG. 50 is a schematic illustration of a base panel coupled to the center hub shown in FIGS. 49A-49C using push/pull toggle clamping mechanisms.

A locking post mechanism generally includes a male component and a female component in which the male component can be inserted and retained for locking a panel to a center hub. A panel is coupled to a center hub when the male component is inserted into the female component. In some embodiments, the male component is disposed on the panel and the female component is provided on the center hub. In other embodiments, the male component is disposed on the center hub and the female component is provided on the panel. Schematic illustrations which are useful for understanding the later embodiments are provided in FIGS. 15-17. FIG. 15 provides a front perspective view of an exemplary panel 1500 having a female component 1502 disposed at a proximal end 1504 thereof. FIG. 16 provides a partial cut away view that is useful for understanding how the panel 1500 can be coupled to an exemplary center hub 1600. FIG. 17 provides a rear perspective view of a plurality of panels coupled to the center hub 1600. FIG. 49 provides a top perspective view of the center hub 1600. FIG. 50 provides a side view of center hub 1600.

As shown in FIGS. 16-17, the center hub 1600 comprises a planar body 1602 having a groove 1606 formed in a peripheral edge portion 1604 thereof. A plurality of male components 1608 are formed along a sidewall 1610 of the groove 1606. Each male component 1608 comprises an aperture formed through the sidewall 1610 that is sized and shaped to receive at least a portion of a pin 1612. During assembly of the center hub 1600, the pin 1612 is inserted into the corresponding aperture 1618 thereof and secured therein. The pin 1612 can be secured to the sidewall 1610 via a chemical bond, an adhesive, a thread or other suitable means. The pin 1612 may be a compressible pin.

The panel 1500 has a female component 1502 configured to engage the male component 1608 so as to lock the panel 1500 in place. In this regard, the female component 1502 includes a dimple molded in a sidewall 1504 of the panel 1500, as shown in FIG. 15. The dimple provides a concaved groove 1622 on an interior surface 1614 of the sidewall 1504. The concaved groove 1622 is sized and shaped to receive at least a portion of the pin 1612. When the pin 1612 is inserted into the concaved groove 1622, the sidewall 1504 of the panel 1500 is prevented from being dislodged from the groove 1606 by forces caused by wind or other factors. A frictional force between a planar surface 1624 of the sidewall 1504 and a surface 1626 also helps to prevent the dislodgement of the panel 1500 from groove 1606.

Figure 18:
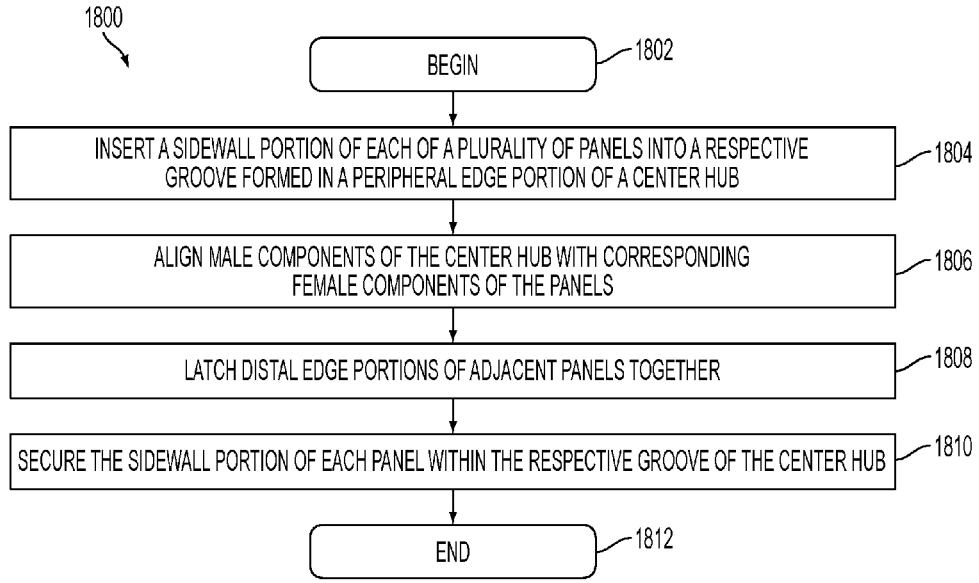
FIG. 18 is a flow diagram of an exemplary method for coupling a plurality of panels to a center hub using locking post mechanisms.

Referring now to FIG. 18, there is provided a flow diagram of an exemplary method 1800 for coupling a plurality of panels 1500 to the center hub 1600. As shown in FIG. 18, the method 1800 begins with step 1802 and continues with step 1804. In step 1804, a sidewall portion 1616 of each of a plurality of panels 1500 is inserted into a respective groove 1606 formed in a peripheral edge portion 1604 of the center hub 1600. Thereafter, in step 1806, the male components 1612 of the center hub 1600 are aligned with corresponding female components 1608 of the panels 1500. Once the male and female components 1612, 1608 are in proper alignment, step 1808 is performed where distal edge portions 1508 of adjacent panels 1500 are latched together. The latching can be facilitated using latching means attached to the distal edge portions 1508 of the panels 1500. The latching means can include, but is not limited to, panel-to-panel latching mechanisms described below and/or other latching means as shown in FIG. 15.

As a result of the latching, the panels 1500 are drawn toward each other, which causes the panels 1500 to tilt in a forwards direction as denoted by the arrow 1620 of FIG. 16. As a consequence of the forward tilting, the panels 1500 are locked into position as shown by step 1810. The locking is achieved by: causing the surfaces 1624, 1624 to come in frictional contact with each other; and causing pins 1612 of the center hub 1600 to be inserted into corresponding concaved grooves 1622 of the panels 1500 as shown in FIG. 16. Subsequently, step 1812 is performed where the method 1800 ends.

Figure 19:
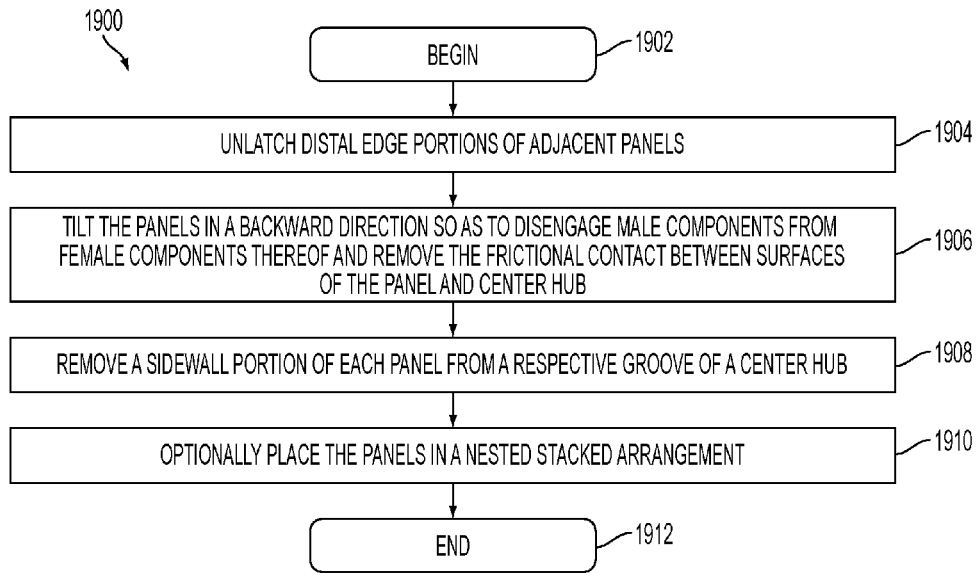
FIG. 19 is a flow diagram of an exemplary method for decoupling a plurality of panels from a center hub employing locking post mechanisms.

Referring now to FIG. 19, there is provided a flow diagram of an exemplary method 1900 for decoupling the plurality of panels 1500 from the center hub 1600. As shown in FIG. 19, the method 1900 begins with step 1902 and continues with step 1904. In step 1904, distal edge portions 1508 of adjacent panels 1500 are unlatched. In some embodiments, the panels 1500 are latched together using panel-to-panel latching mechanisms. The manner in which the panel-to-panel latching mechanisms are unlatched will be discussed below. As a consequence of the unlatching, gravity causes the panels 700 to move away from each other, which causes the panels 700 to rotate in a backward direction (i.e. a direction opposite of the direction denoted by arrow 1620 of FIG. 16). Consequently, the pins 1612 are disengaged from the concaved grooves 1622, as shown by step 1906. Also, the surfaces 1624, 1624 are moved away from each other so as to remove the frictional contact therebetween.

In a next step 1908, a sidewall portion 1616 of each of a plurality of panels 1500 is removed from a respective groove 1606 of the center hub 1600. Thereafter, optional step 1910 is performed to place the panels in a nested stacked arrangement (such as that shown in FIG. 6). Notably, the female components 1622 are designed such that they do not interfere with a compact panel-to-panel nested stacking arrangement for storage. Subsequent to completing step 1908 or optional step 1910, step 1912 is performed where the method 1900 ends.

Moment Carrying Joint Mechanism

Figure 21:
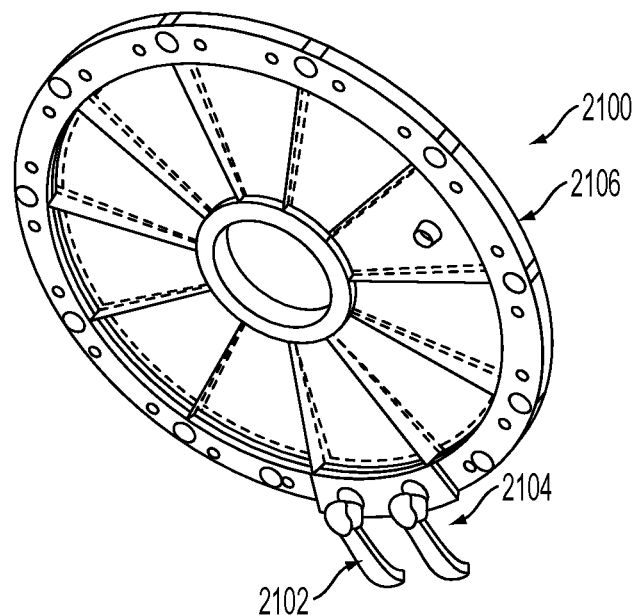
FIG. 21 is a rear perspective view of an exemplary hub implementing a moment carrying joint mechanism.
Figure 22:
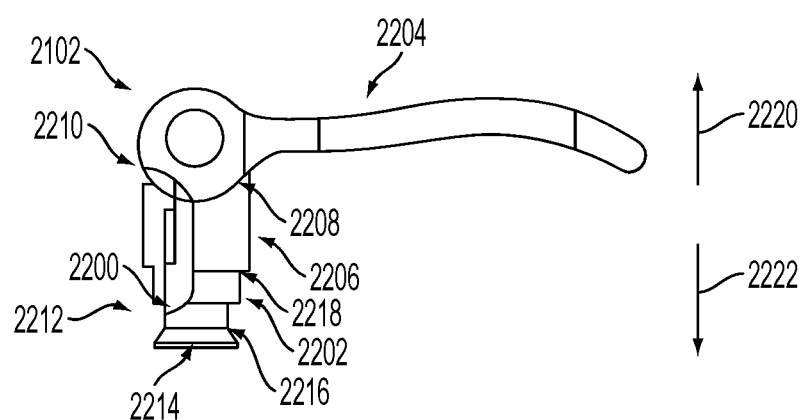
FIG. 22 is a schematic illustration of a securing member mounted to the hub of FIG. 21.

In conventional reflect antenna designs, reflector wind moment loads are typically transferred to positioner structures via center hubs. This conventional manner of transferring reflector wind moment loads is not able to be implemented with the present invention because the center hub has the electronic communication unit 202 coupled to a back surface thereof, as shown in FIG. 2. Therefore, the present invention employs a novel manner of transferring reflector wind moment loads to the tripod positioning structure 118 (shown in FIG. 1). In this regard, the present invention employs a moment carrying joint mechanism. The moment carrying joint mechanism allows reflector wind moment loads to be transferred through a base panel 120 (shown in FIG. 1) of the PSA reflector 102 (shown in FIG. 1) to the tripod positioning structure 118. The moment carrying joint mechanism generally comprises a specially designed tab disposed on the base panel 120 and clamps disposed on the center hub. An exemplary embodiment of such a moment carrying joint mechanism will be described in detail below in relation to FIGS. 20-22.

Figure 20:
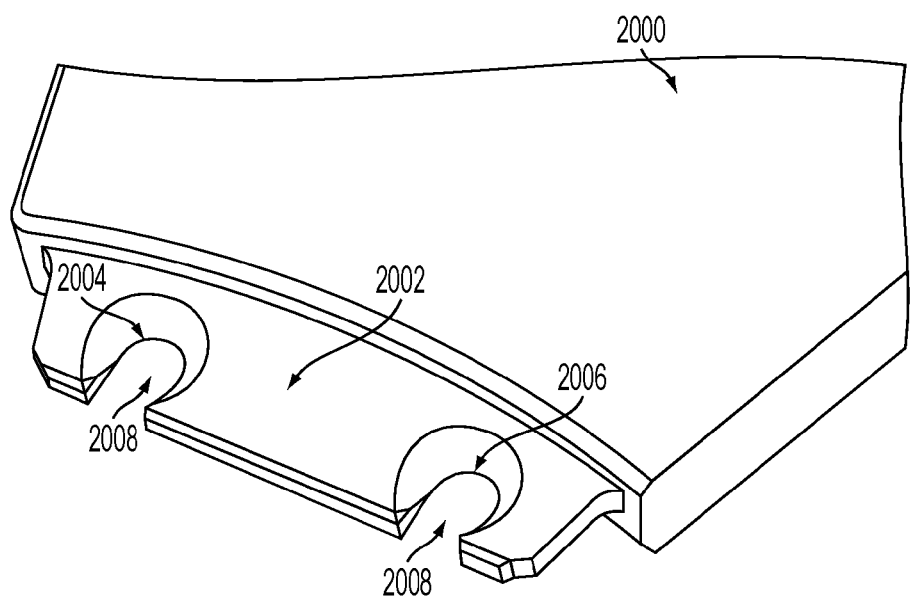
FIG. 20 is a schematic illustration of an exemplary panel with a specially designed tab for facilitating a transfer of reflector wind moment loads to a tripod positioning structure.

A schematic illustration of an exemplary panel 2000 with a specially designed tab 2002 is provided in FIG. 20. Tab 2002 has countersink holes 2004, 2006 formed therethrough. Each countersink hole 2004, 2006 has a portion of its angled sidewall 2008 cut away for allowing the tab 2000 to slide past screw bodies 2200 of securing members 2102, 2104 mounted on the center hub 2100 when inserted into or removed from a respective insert space 2106 of the center hub 2100. As the tab 2000 is inserted into the insert space 2106, the screw bodies 2200 become disposed in their respective countersink holes 2004, 2006 such that the angled sidewalls 2008 are positioned adjacent to end portions 2212 thereof.

Each of the securing members 2102, 2104 comprises a draw screw 2202 with a cam draw lever 2204 attached thereto. A portion of the draw screw 2202 extends into a respective insert space 2106 of the center hub 2100. The lever 2204 is attached to the draw screw 2202 and the center hub 2100 via a retainer 2206 such that it can rotate relative thereto. In this regard, the retainer 2206 has a cylindrical pivot seat 2208 for a cam lobe 2210 to rotate in. Rotation of the lever 2204 in a counter clockwise direction exerts a camming force against the pivot seat 2208. The camming action between the lever 2204 and the pivot seat 2208 draws or urges a portion 2218 of the draw screw 2202 in a direction 2220. When the draw screw 2202 is moved in a direction 2220, the tab 2000 can be slid into or out of a respective insert space 2106 of the center hub 2100. In contrast, when the lever 2204 is rotated in a clockwise direction, the portion 2218 of draw screw 2202 is urged in direction 2222 such that the tab 2000 can be clamped between the securing member 2102, 2104 and the center hub 2100, and thereby retained within the insert space 2106.

Notably, the draw screw 2202 has an end portion 2212 that is sized and shaped to be received in a countersink hole 2004, 2006 of the panel 2000. In this regard, the end portion 2212 has a flat engagement surface 2214 with a frusto-conical shaped sidewall 2216. The angles of the frusto-conical shaped sidewall 2216 and the sidewalls 2008 of the countersink holes 2004, 2006 are the same as or substantially similar such that their cross sectional profiles match. The angled sidewalls 2216, 2008 collectively assist in securely locking the panel 2000 in its fully inserted position.

Push/Pull Toggle Clamping Mechanism

As noted above, the base panel can be absent of a specially designed tab. In this scenario, the base panel joint may alternatively use a push/pull toggle clamp for the moment carrying joint mechanism. FIGS. 50-51 show schematic illustrations of such a base panel 5000 with two push/pull toggle clamps 5002 coupled thereto. The push/pull toggle clamps 5002 provide strong stiff joints which resist force in all three directions and moment rotations in all principle directions. The push/pull toggle clamps 5002 can include, but are not limited to, push/pull toggle clamps having part number CL-150-TPC which are available from CarrLane Manufacturing Co. of St. Louis, Mo. This type of push/pull toggle clamp allows higher joint compression between a sidewall of the base panel 5000 and a sidewall of the center hub 1600 (e.g., 4900 of FIG. 49) to create high compression loads. Notably, the push/pull toggle clamp provides a high clamping force (e.g., greater than 150 lbs) without tools and directly in the plane of the panel-to-hub joint.

Figure 52:
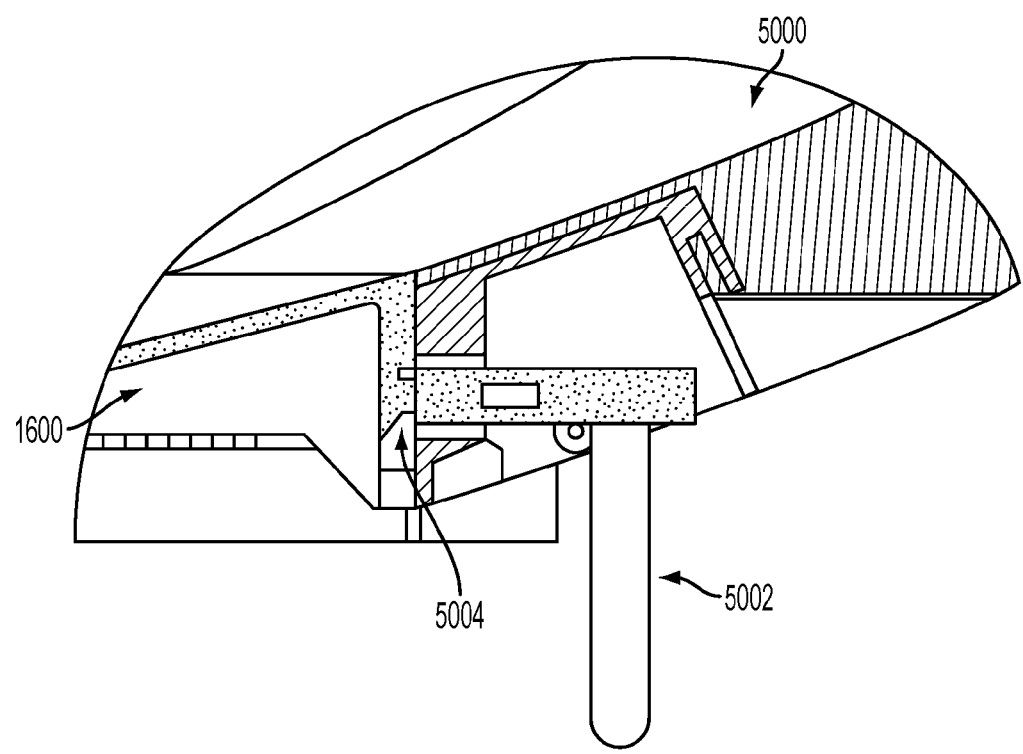
FIG. 52 is a schematic illustration of a panel coupled to the center hub shown in FIGS. 49A-49C using a push/pull toggle clamping mechanism of FIGS. 50 and 51A-51C.
Figure 53:
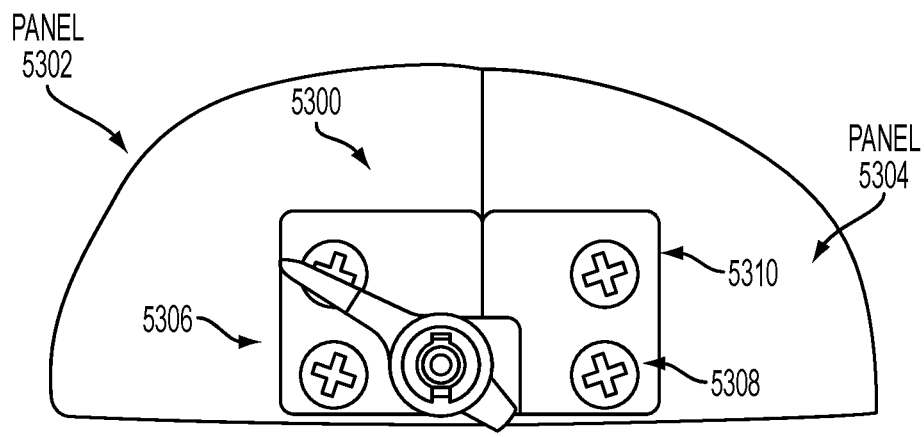
FIGS. 53-58 provide schematic illustrations that are useful for understanding an exemplary panel-to-panel latching mechanism.
Figure 54:
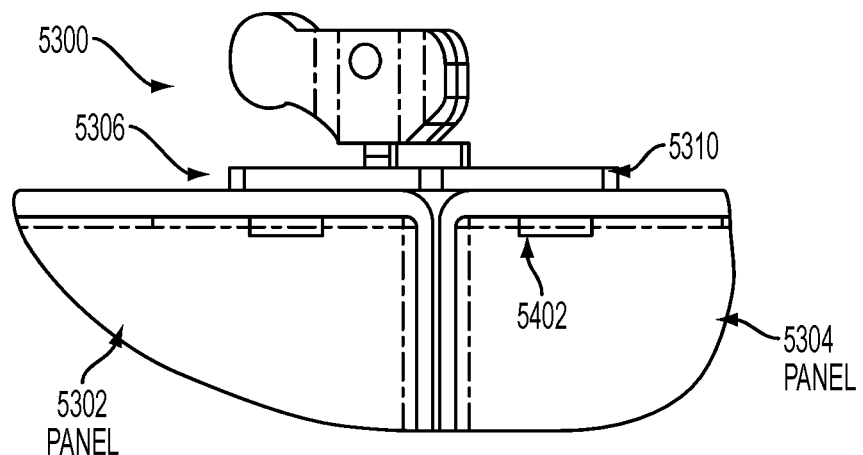
Figure 55:
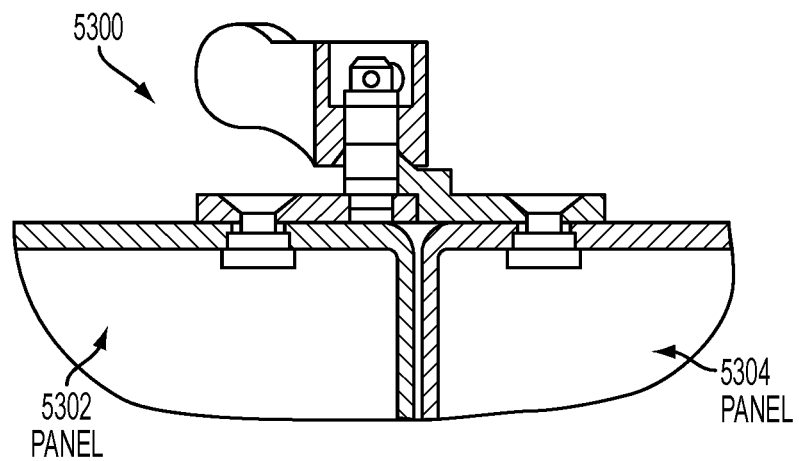
Figure 56:
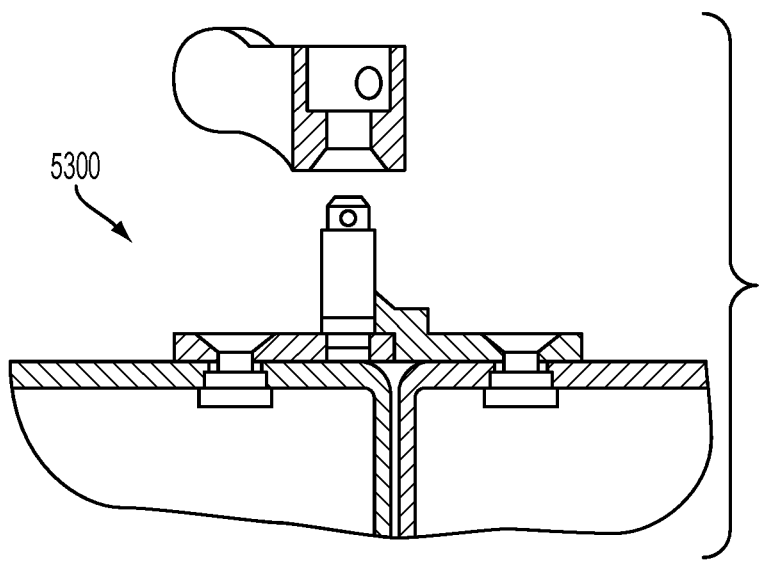
Figure 57:
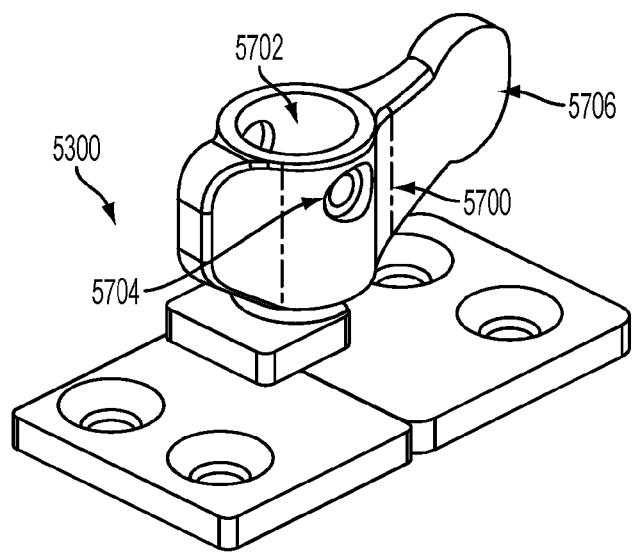
Figure 58:
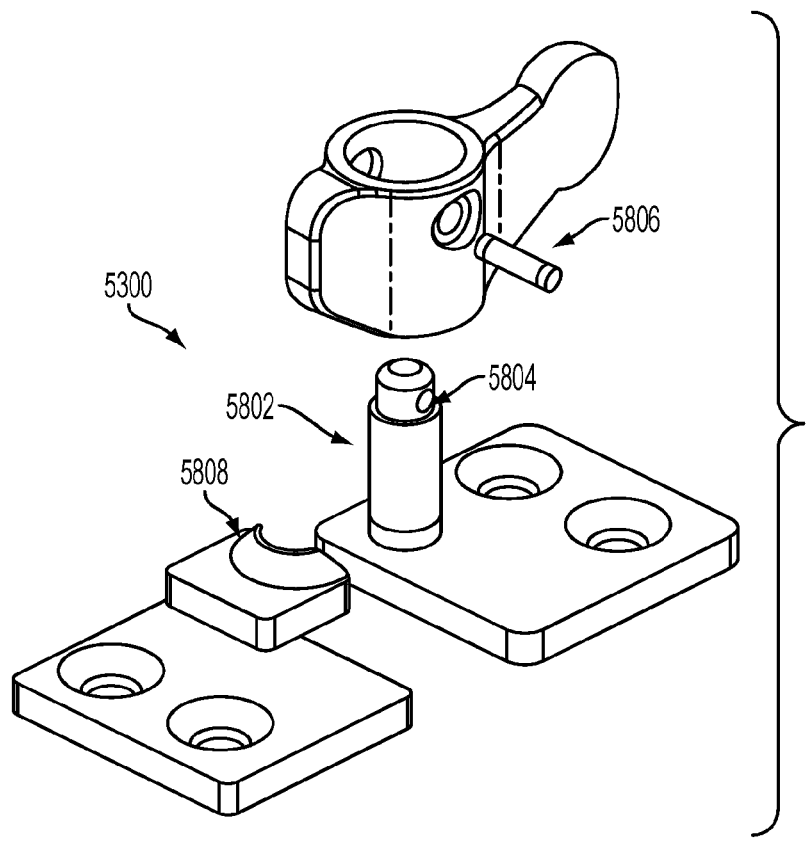

As shown in FIG. 49, the sidewall 4900 of the center hub 1600 comprises slots 4902. The slots 4902 are configured for receiving at least a threaded screw portion 5004 of a push/pull toggle clamp 5002 as shown in FIG. 52, thereby facilitating the clamping together of the base panel 5000 and sidewall 4900 of the center hub 1600. This slot/clamp configuration allows blind assembly from the under side of the base panel 5000.

Figure 51A:
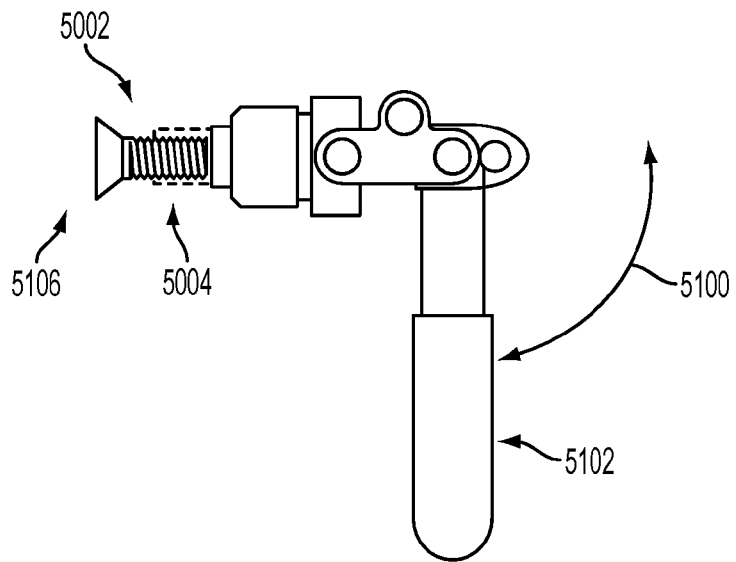
FIGS. 51A-51C provide schematic illustrations that are useful for understanding the operations of the push/pull toggle mechanism of FIG. 50.
Figure 51B:
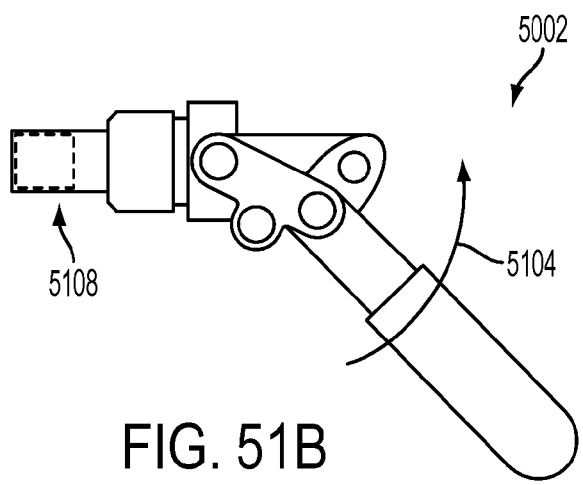
Figure 51C:
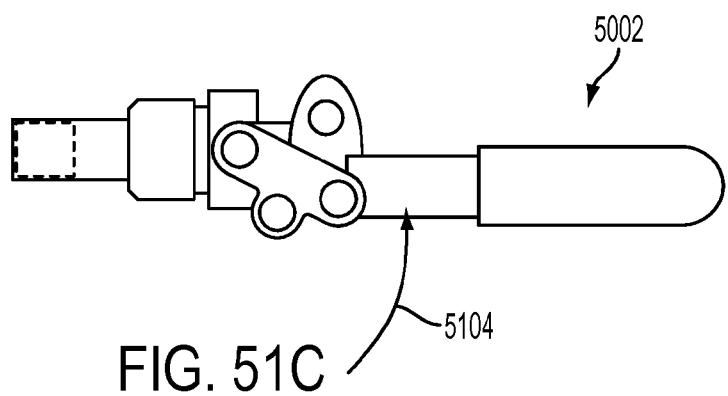

The operation of the push/pull toggle clamp 5002 will now be described in relation to FIGS. 51A-51C. As shown in FIG. 51A, the clamp 5002 comprises a handle 5102 that can be moved in two opposing directions, as shown by arrow 5100. This movement allows the handle 5102 to be transitioned between a rest position shown in FIG. 51A to a fully engaged position shown in FIG. MC. A center snap (not shown in FIGS. 51A-51C) is employed for providing an indication to a user that the handle 5102 has been transitioned into its fully engaged position shown in FIG. 51C.

When the handle 5102 is moved in a first direction 5104, a flat-head screw 5106 is drawn into a body 5108 of the clamp 5002, as shown in FIGS. MB and MC. In this regard, the flat-head screw 5106 comprises the threaded screw portion 5004 configured to engage a threaded interior surface (not visible in FIGS. 51A-51C) of the body 5108. Accordingly, during operation, the flat-head screw 5106 acts as a pull feature which provides centering and alignment of the panel 5000 relative to the center hub 1600. Notably, the flat-head screw 5106 allows easy length adjustments at the factory for optimum user over center force feel.

When the handle 5102 is moved in a second direction opposed from the first direction 5104, the flat-head screw 5106 is pushed out of the body 5108 of the clamp 5002 via the threads thereof. Accordingly, the handle 5102 is transitioned from its fully engaged position shown in FIG. 51C to its rest position shown in FIG. 51A such that the base panel 5000 can be stowed.

Panel-to-Panel Latching Mechanism

As noted above, the plurality of panels 106 are latched together so as to form the PSA reflector 102. The panels are latched together using panel-to-panel latching mechanisms which enable easy and quick assembly/disassembly of the PSCA assembly 100, as well as compact storage thereof as shown in FIG. 24. An exemplary embodiment of a panel-to-panel latching mechanism will now be described in relation to FIGS. 23A-23C.

Figure 23A:
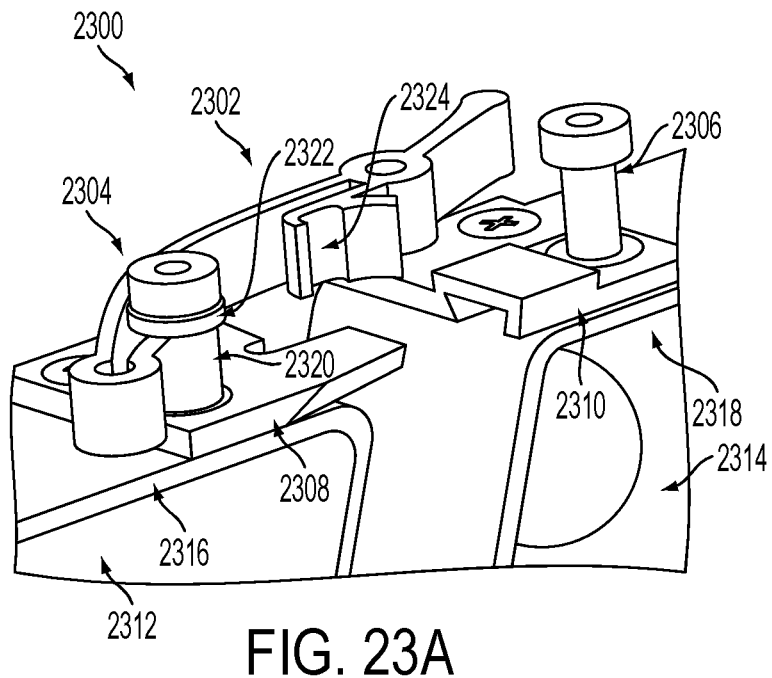
FIG. 23A-23C each provide a schematic illustration of an exemplary latching mechanism.
Figure 23B:
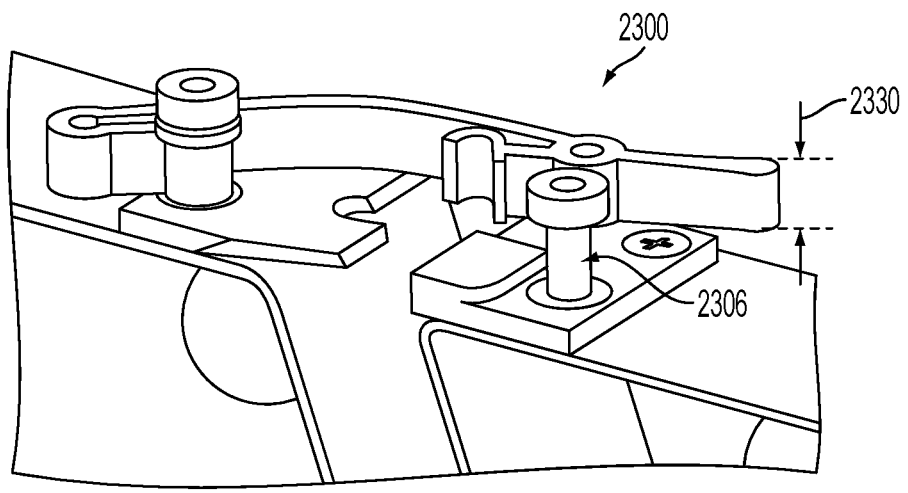
Figure 23C:
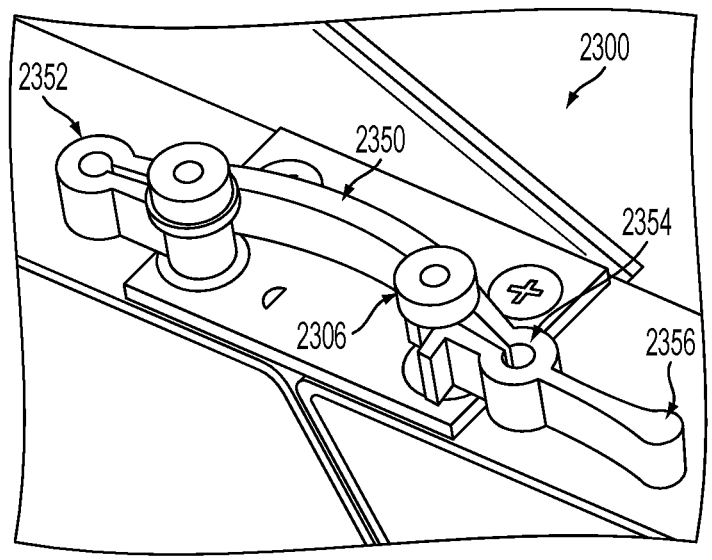

Referring now to FIG. 23A-23C, there is provided schematic illustrations of an exemplary latching mechanism 2300 in a plurality of different positions relative to adjacent panels 2312, 2314. As evident from FIGS. 23A-23C, the latching mechanism 2300 is configured to latch the adjacent panels 2312, 2314 together. The latching mechanism 2300 is also configured to facilitate easy and quick assembly and disassembly of the PSCA assembly 100 of FIG. 1. As such, the latching mechanism 2300 does not require any tools for latching and unlatching the panels 2312, 2314. In this regard, the latching mechanism 2300 is designed to include a single molded or machined latch. The single molded/machined piece can be made by wire Electric Discharge Machining ("EDM") or by an extruded solid slicing technique. All features of the latching mechanism 2300 can be perimeter cut without requiring secondary drilling, machining or threading of the EDM wire. Notably, the latching mechanism 2300 is absent of springs, handles, bearings, rivets, hooks or screws. As such, the latching mechanism 2300 is less complex and costly as compared to conventional latching mechanisms used in PSCA assembly designs.

The latching mechanism 2300 comprises a draw latch 2302, posts 2304, 2306 and securing plates 2308, 2310. The posts 2304, 2306 may be formed from stainless steal or any other suitable material. Each securing plate 2308, 2310 has one of the posts 2304, 2306 attached thereto. This attachment can be achieved via a chemical bond, a mechanical bond or an adhesive bond. Securing plate 2308 is securely coupled to a sidewall 2316 of the panel 2312. Similarly, securing plate 2310 is securely coupled to a sidewall 2318 of the panel 2314. The plates 2308, 2310 can be secured to the panels 2312, 2314 via a chemical bond, a mechanical bond or an adhesive bond.

The draw latch 2302 is mechanically coupled to securing plate 2308 via post 2304. In this regard, the draw latch 2302 has a securing member 2320 with an aperture 2400 (shown in FIG. 24) formed therethrough. The post 2304 is disposed in the aperture 2400 such that the securing member 2320 is retained between a flange 2322 thereof and the plate 2308. In one embodiment, the draw latch 2302 is retained in such a manner that it can pivot about post 2304 in a clockwise direction and a counter clockwise direction (from the perspective of FIGS. 23A-23C). In another embodiment, the draw latch 2302 is fixedly attached to the post 2304. In this scenario, the post 2304 is able to rotate relative to the panel 2312. A lubricant may be included between the post 2304 and surfaces of through holes in which the post is disposed 2304 so as to reduce or eliminate any friction therebetween. In both embodiments, the latching mechanism 2300 can be latched by pivoting the draw latch 2302 in a clockwise direction, as shown in FIGS. 23A-23C. In the latched position shown in FIG. 23C, a catch member 2324 of the draw latch 2302 snappingly engages the post 2306 of panel 2314. The latching mechanism 2300 can be unlatched by pivoting the draw latch 2302 in a counter clockwise direction.

The draw latch 2302 has three spring flexural points: two circular spring flexure joints 2352, 2354; and a cantilever arm 2350. The cantilever arm 2350 can have an arched profile as shown in FIGS. 23A-23C, a straight profile (not shown), or a generally "Z" shaped profile (not shown). The cantilever arm 2350 facilitates the engagement of the catch member 2324 to the post 2306 of panel 2314. In this regard, the cantilever arm 2350 guides the catch member 2324 onto the post 2306.

The draw latch 2302 also comprises a release tab 2356. The release tab 2356 protrudes out and away from the spring flexure joint 2354. The release tab 2356 facilitates application of torque to the latching mechanism 2300 so as to produce a counter clockwise rotation thereof, which releases a horizontal pre-load tension in the latching mechanism 2300.

The tension and stresses within the latching mechanism 2300 can be controlled by the profile thickness 2330, the material choice, stock thickness, the diameters of the circular spring flexure joints 2352, 2354, and the under-sizing of the spacing between a circle center point of the securing member 2320 and an arc center point of the catch member 2324 to the actual part spacing. The material can include, but is not limited to, a high strength aluminum with a hard anodized finish to prevent wear and galling when the latching mechanism 2300 contacts posts 2304, 2306.

Figure 59:
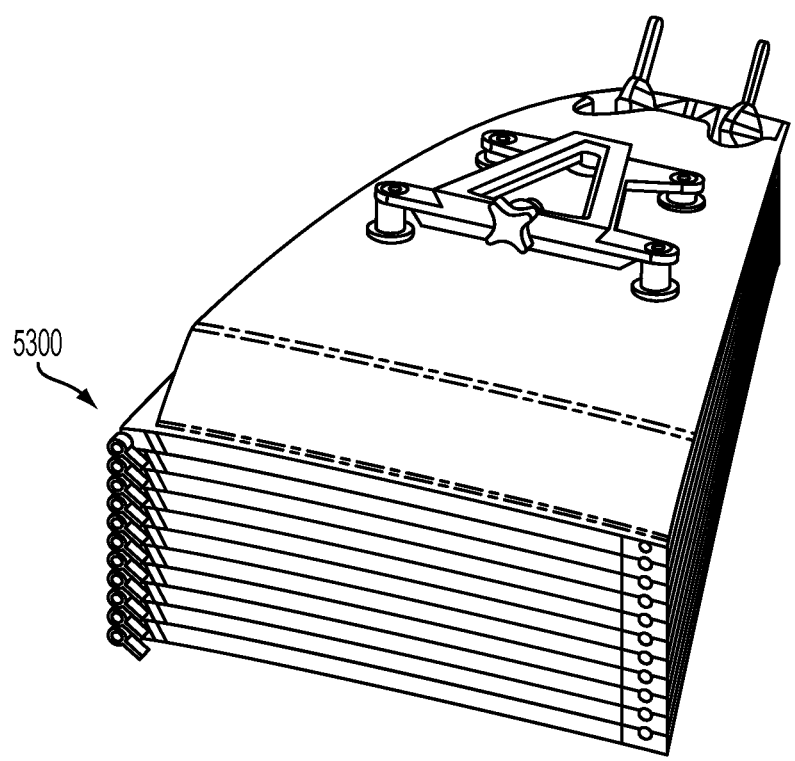
FIG. 59 is a schematic illustration of a plurality of nested panels with the panel-to-panel latching mechanism shown in FIGS. 53-58.
Figure 60:
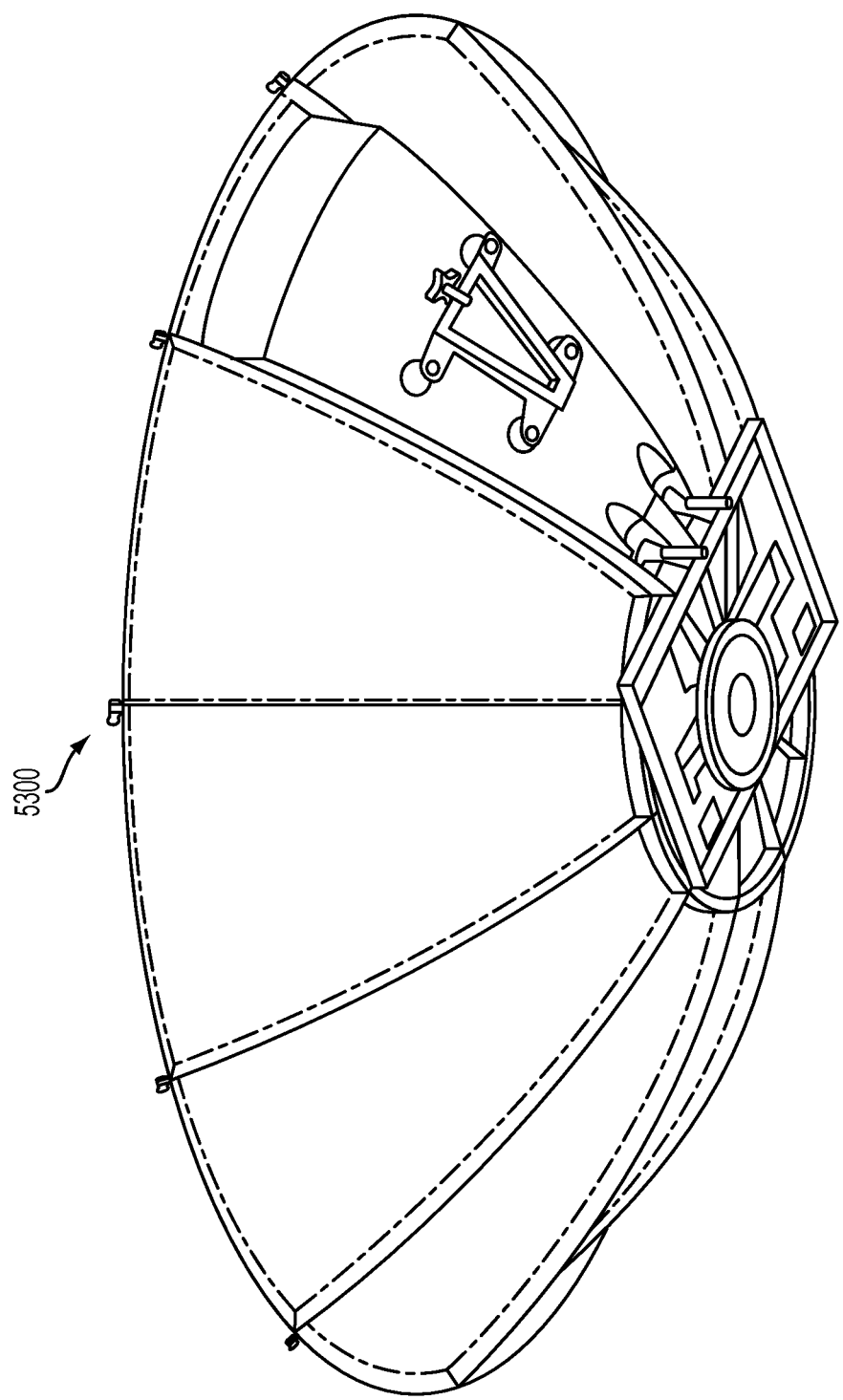
FIG. 60 is a schematic illustration of a PSA reflector employing the panel-to-panel latching mechanism shown in FIGS. 53-58.

Another exemplary embodiment of a panel-to-panel latching mechanism 5300 will now be described in relation to FIGS. 53-59. The latching mechanism 5300 is shown in FIGS. 53-56 as coupling two panels 5302, 5304 together. A plurality of the latching mechanisms 5300 form a rigid link around the perimeter of the panels to affect hoop strength to resist wind deformation, as shown in FIG. 60. Also, the panel-to-panel latching mechanism 5300 maintains a 60% panel nesting, as shown in FIG. 59. Notably, the latching mechanism 2300 described above is more difficult to manufacture than latching mechanism 5300.

As shown in FIGS. 53-58, latching mechanism 5300 comprises a clevis plate 5306 coupled to a first panel 5302 and a stud plate 5310 coupled to a second panel 5304. This coupling can be achieved using screws 5308, nuts 5402, or other mechanical coupling means. The plates 5306, 5310 provide a simple fastening system with the following features: repeatable panel-to-panel alignment; panel restraint in all directions; good tie-in of panel radial ribs for stiffness; no pinching for over center snap fit; and improved stow form factor compactness.

The stud plate 5310 has a threaded stud 5804 coupled thereto. The coupling can be achieved via a weld. A captive wing-nut 5700 is also provided with the stud plate 5310. In this regard, the captive wing-nut 5700 has an aperture 5702 formed therethrough that defines an insert space. The threaded stud 5804 is sized and shaped to fit within the insert space of the captive wing-nut 5700. A clevis plate fork 5808 fits around the threaded stud 5804 and can be clamped in place by the captive wing-nut 5700. A clevis pin 5806 is provided for holding the threaded stud 5804 in place within the insert space of the captive wing-nut 5700. Accordingly, the clevis pin 5806 may be at least partially threaded, and sized and shaped for insertion through apertures 5704, 5804 formed in the captive wing-nut 5700 and stud 5804. Notably, clevis plate fork 5808, captive wing-nut 5700, stud 5700, and clevis pin 5806 collectively work together to assure proper alignment of the panels 5302, 5304 relative to each other. In this regard, the captive wing-nut 5700 comprises a female cone 5602 on its bottom side. The clevis plate 5306 comprises a partial male cone 5604 on its top side. The cones 5602, 5604 center and force the edges of the plates to abut and thus prevent rotation.

The captive wing-nut 5700 also comprises a wing 5706 so that it can be easily tightened and loosened by hand without a tool. Hand tightening provides good force while still being removable later. The captive wing-nut 5700 includes a thread (not visible in FIGS. 53-58) for engaging an engagement surface 5808 of the clevis plate 5306. Engagement of the thread and engagement surface 5808 facilitates the coupling of the panels together.

Feedhorn-to-Hub Quick Connect Mechanism

The Feedhorn-to-Hub Quick Connection ("FHQC") mechanism is designed to facilitate the easy and quick assembly/disassembly of the PSCA assembly 100. The FHQC mechanism allows the use of interchangeable feedhorn assemblies with the PSA reflector 102. Consequently, the electronic communication unit 202 is able to communicate with communication satellites at a plurality of different operating frequencies. Also, the interchangeable feedhorn assemblies provide a means for controlling transmit and receive polarization of free space RF radiation. The polarization is controlled by changing an orientation of an antenna feed. The feed orientation may be changed by (a) replacing a feedhorn assembly with another feedhorn assembly providing a different angular orientation of an antenna feed relative to a center hub or (b) adjusting the angular orientation of an antenna feed via a mechanical adjustment means. An exemplary embodiment of the FHQC mechanism will now be described in relation to FIGS. 25-27. Notably, the FHQC mechanism is designed to eliminate support spars which are typically employed in conventional PSCA assemblies for ensuring that the position of the antenna feed relative to the reflector is not affected by cantilevered moment loads from wind gusts.

Figure 25:
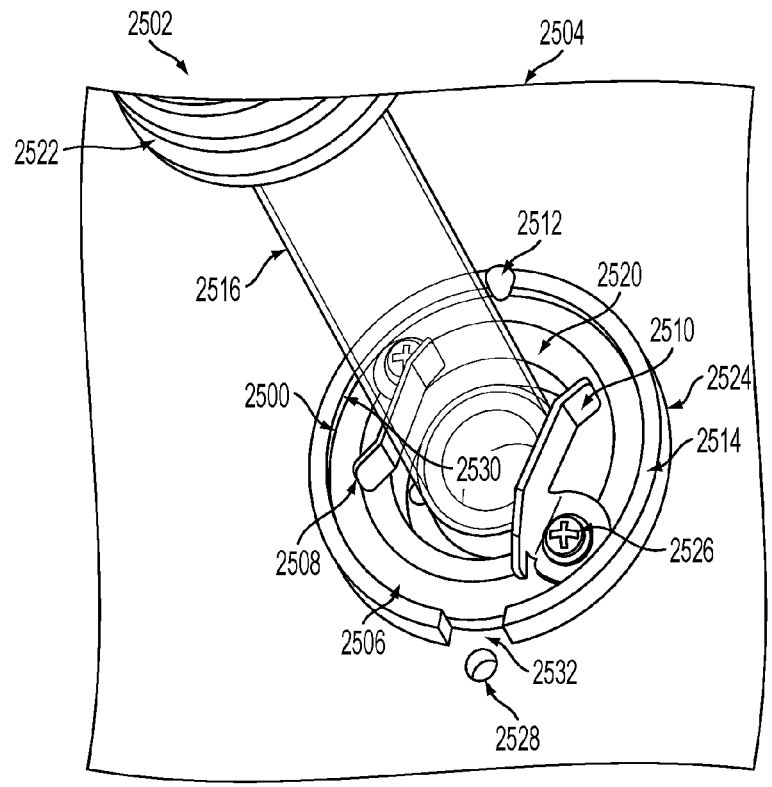
FIG. 25 is a schematic illustration of a feedhorn assembly coupled to a center hub via a quick connection mechanism.

Referring now to FIG. 25, there is provided a schematic illustration of a feedhorn assembly 2502 coupled to a center hub 2504 using an FHQC mechanism 2500. The FHQC mechanism 2500 comprises a feed flange 2506 and a socket 2514. The feed flange 2506 comprises a rim protruding from an end 2520 of a shaft 2516. An antenna feed 2518 is mounted on the opposing end 2522 of the shaft 2516. The shaft 2516 is coupled to the feed flange 2506 at a predetermined angular orientation selected for controlling a polarization in a desired manner. The coupling between components 2516, 2506 can be achieved via an interference fit.

The feed flange 2506 is sized and shaped to fit within the socket 2514. The socket 2514 is attached to or integrally formed with the center hub 2504. The socket 2514 defines a seat for the feed flange 2506. The outer perimeter of the feed flange 2506 has a precision pilot outside cylindrical diameter. The inner perimeter of the socket 2514 likewise is formed to a precise diameter, so that the feed flange 2506 is received within the seat with minimal clearance between the inner and outer perimeters of the components 2506, 2514. This feature provides precise and repeatable centering of the feedhorn assembly 2502 with respect to a PSA reflector.

Figure 26:
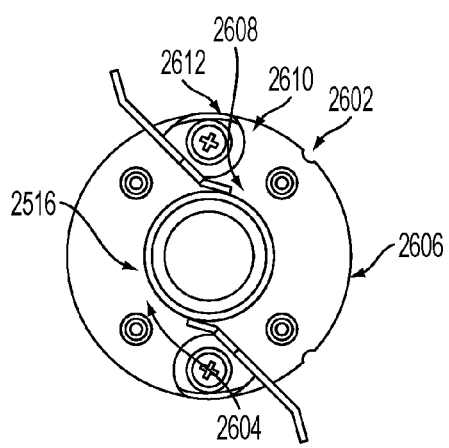
FIG. 26 is a schematic illustration of levers of the quick connection mechanism shown in FIG. 25 in their open positions.
Figure 27:
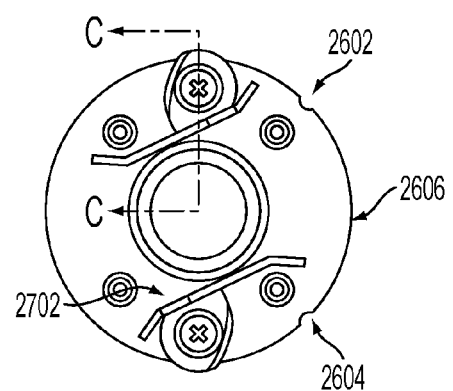
FIG. 27 is a schematic illustration of levers of the quick connection mechanism shown in FIG. 25 in their closed positions.

The feed flange 2506 has indentations 2602, 2604 formed in a peripheral edge 2606 thereof, as shown in FIGS. 26-27. The indentations 2602, 2604 facilitate clocking control (i.e., adjustment) of the clock position (i.e., angular orientation) of the antenna feed 2518 relative to the center hub 2504. In this regard, it should be understood that a clocking pin 2512 is provided on the center hub 2504. The clocking pin 2512 may be mounted on the center hub 2504 via a press fit or other means. When a right hand circular polarization is desired, the clocking pin 2512 is placed within indentation 2604. In contrast, the clocking pin 2512 is placed within indentation 2602 when a left hand circular polarization is desired. Labels or markings can be provided on the feed flange 2506 adjacent to the indentations 2602, 2604 for specifying what type of polarization is controlled by each indentation 2602, 2604, as shown in FIGS. 26-27.

Embodiments of the present invention are not limited to the configuration shown in FIGS. 25-27. For example, the indentations 2602, 2604 may alternatively be formed in the socket 2514. In this scenario, the clocking pin 2512 is mounted on the feed flange 2506.

As shown in FIG. 25, a sidewall 2524 of the socket 2514 has a gap 2532 formed therein. The gap 2532 allows fluids (e.g., water) to drain from the socket 2514. A through hole 2528 is formed in the center hub 2504 to facilitate drainage of fluids when the PSA reflector is pointed at high elevation angles.

Two levers 2508, 2510 are mounted on the feed flange 2506 for facilitating a secure coupling of the feedhorn assembly 2502 to the center hub 2504. The levers 2508, 2510 can be mounted to the feed flange 2506 using pins 2526 or other coupling means which allow the levers 2508, 2510 to rotate relative to the feed flange 2506. The levers 2508, 2510 may rotate in a clockwise direction and a counter clockwise direction (from the perspective of FIGS. 25-27) for facilitating the transition between their open positions shown in FIG. 26 and their closed positions shown in FIG. 27. The feed flange 2506 may be inserted into or removed from the socket 2514 when the levers 2508, 2510 are in their open positions. The feed flange 2506 is securely retained within the socket 2514 when the levers 2508, 2510 are in their closed positions. In some embodiments, the levers 2508, 2510 are fabricated using a metal stamping technique with a secondary forming operation.

As shown in FIGS. 25-27, each lever 2508, 2510 comprises an arm 2608 and an engagement structure 2610. The arm 2608 facilitates the rotation of the lever 2508, 2510 relative to the feed flange 2506. In this regard, the arm 2608 has a relatively broad surface area which allows a user to satisfactorily grasp it when transitioning the lever 2508, 2510 between its open position and closed position. A surface 2702 of the arm 2608 contacts the shaft 2516 when the lever 2508, 2510 is in its closed position. The surface 2702 is sized and shaped to provide structural support to the feedhorn assembly 2502 when the lever 2508, 2510 is its closed position.

The structural support is also facilitated by the engagement structure 2610. In this regard, the engagement structure 2610 has a beveled cam surface 2612. The beveled cam surface 2612 engages a beveled cam groove 2530 formed in a sidewall 2524 of the socket 2514 when the lever 2508, 2510 is its closed position. This camming engagement generates a camming force that secures the lever 2508, 2510 in its closed position. The camming engagement creates high contact forces between the feed flange 2506 and socket 2514 for carrying cantilevered bending moment loads.

Reflector-to-Tripod Mounting Mechanism

Figure 28:
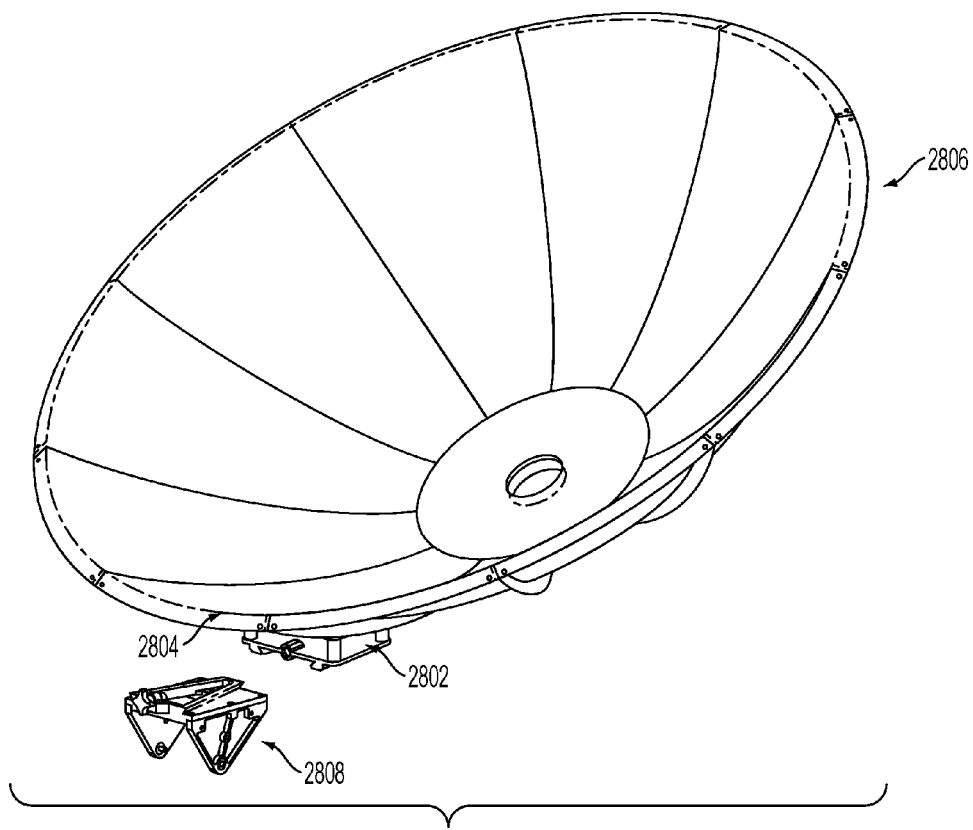
FIG. 28 is a perspective view of a mounting mechanism for mounting a reflector on a tripod positioning structure.

As noted above, the PSA reflector 102 is coupled to a tripod positioning structure 118 via a mounting mechanism. The mounting mechanism is designed to facilitate the easy and quick assembly/disassembly of the PSCA assembly 100. An exemplary embodiment of such a mounting mechanism 2800 will now be described in relation to FIGS. 28-30.

The mounting mechanism 2800 generally comprises a blind mate dove tail mount. In this regard, the mounting mechanism 2800 comprises a female portion 2802 and a male portion 2808. The female portion 2802 is mounted on the back of panel 2804 of a PSA reflector 2806. The male portion 2808 is coupled to or integrally formed with a tripod positioning structure (not shown in FIGS. 28-29 for purposes of simplicity). Embodiments of the present invention are not limited to the illustrated arrangement. For example, the female portion 2802 can be alternatively coupled to the tripod positioning structure. In this scenario, the male portion 2808 is coupled to the panel 2804 of a PSA reflector 2806.

Figure 29:
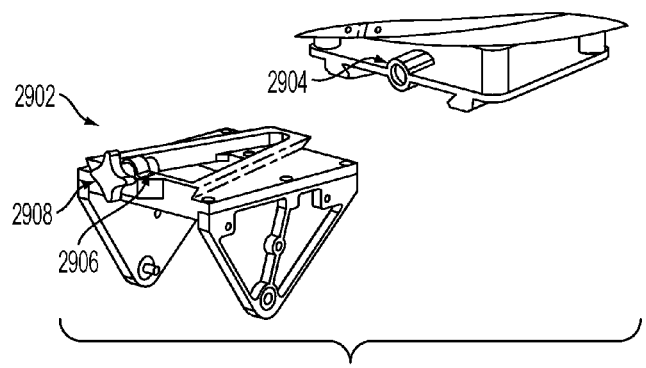
FIG. 29 is a perspective view of the mounting mechanism of FIG. 28.

A perspective view of the female and male portions 2802, 2808 is provided in FIG. 29. As shown in FIG. 29, the male portion 2808 comprises a knob 2902 having a threaded shaft 2906 and an actuating portion 2908. The female portion 2802 includes a receptacle 2904 for receiving the threaded shaft 2906 of the male portion 2808. Accordingly, the receptacle 2904 has internal threads that match the threads of shaft 2906. The threads cause a threading engagement between the female portion 2802 and the male portion 2808 when the knob 2902 is rotated. As a result of the threading engagement, shaft 2906 is pulled into the receptacle 2904, thereby creating a zero-blacklash interference fit between the female and male portions 2802, 2808. The interference fit provides a rigid connection between the tripod positioning structure and the panel 2804 of the PSA reflector 2806 that resists applied moments and linear displacement of the panel 2804 and the tripod positioning structure.

Figure 30:
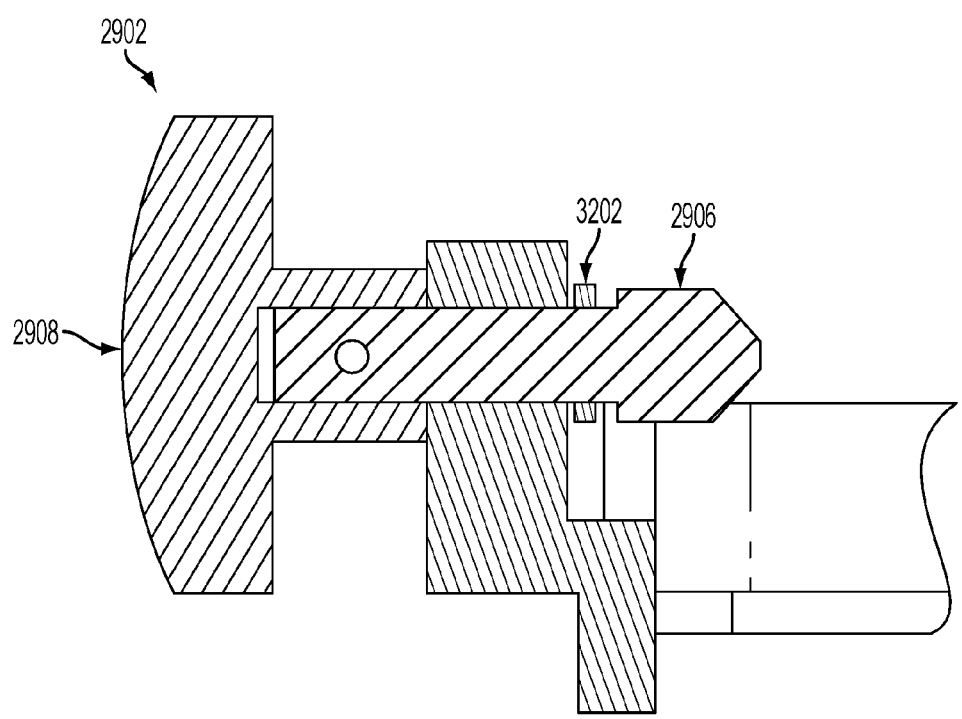
FIG. 30 is a partial cross sectional view of a drive screw for securing dove tail plates in FIG. 29.
Figure 31:
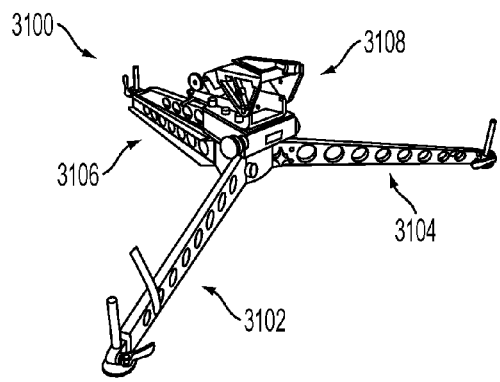
FIGS. 31-34 each provide schematic illustrations of an exemplary tripod positioning structure.
Figure 32:
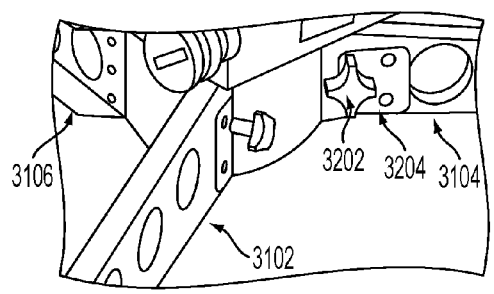
Figure 33:
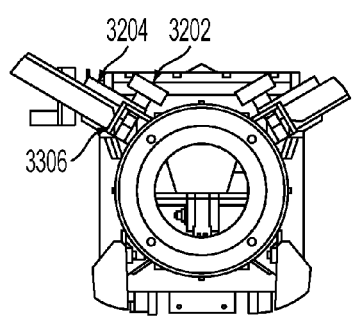
Figure 34:
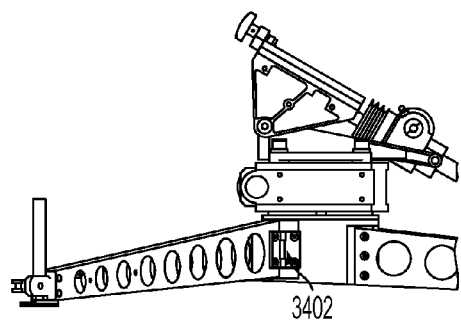

The male portion 2808 also includes a snap ring 3202, as shown in FIG. 30. The snap ring 3202 is fixed from rotation in relation to the knob 2902. The snap ring 3202 engages the shaft 2906 of the knob 2902 via additional threads on the shaft 2906. The snap ring 3202 captures or captivates the knob 2902. The snap ring 3202 exerts a reactive force on the knob 2902 when the knob 2902 is rotated in the loosing direction while the female and male portions 2802, 2808 are in a mated condition. The reactive force is transferred to the female portion 2802 via the shaft 2906, and acts to de-mate the female portion 2802 from the male portion 2808. This feature can be useful, for example, when the PSA reflector 2806 is to be disassembled for transport or storage. Reversing the threaded feature helps to break the joint when disassembly is required.

Tripod Positioning Structure

An exemplary tripod positioning structure 3100 will now be described in relation to FIGS. 31-37. The tripod positioning structure 3100 comprises two folding legs 3102, 3104 and a stationary leg 3106. The legs 3102, 3104 are hingedly coupled to a hub 3108 via hinges 3402. Accordingly, the legs 3102, 3104 can be pivotally transitioned between their deployed positions shown in FIG. 31 and their stowed positions shown in FIG. 37. In their stowed positions, the folding legs 3102, 3104 are nested within the stationary leg 3106. This nested arrangement facilitates the compact storage of the tripod positioning structure 3100. Notably, the stationary leg 3106 is designed to have an internal cavity in which a feedhorn assembly 3700, cables and other components of a PSCA assembly can be stored.

In some embodiments, the hinges 3402 comprise standard commercial cabinet or door hinges. While commercial cabinet and door hinges provide the requisite pivoting action, play or stop exists in the hinge interface which can adversely affect the stiffness of the tripod positioning structure. Therefore, in these scenarios, the tripod positioning structure has threaded knobs 3202 and plates 3204 which add the requisite stiffness by stretching the play out of the commercial cabinet or door hinges. The knobs 3202 and plates 3204 accomplish this by preloading the associated leg 3102, 3104 against a hard stop 3306 of the hub 3108. Accordingly, each plate 3204 is mounted on a side of a respective leg 3102, 3104 that is opposite from that on which a hinge 3402 is mounted. The knobs 3202, hard stops 3306, and preloaded hinges 3402 prevent displacement of the legs 3102, 3104 in all three principle axes and all three moment/rotation axes. Consequently, the tripod positioning structure 3100 provides a stiff mounting platform for an antenna to point at a satellite in high winds with minimal pointing loss.

Figure 36:
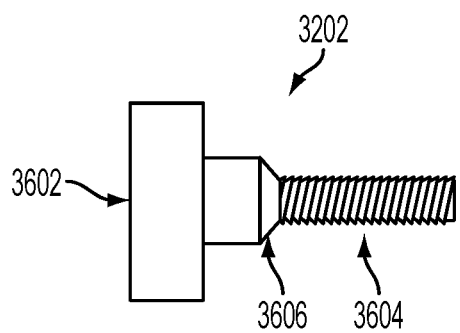
FIG. 36 is a schematic illustration of a knob.
Figure 37:
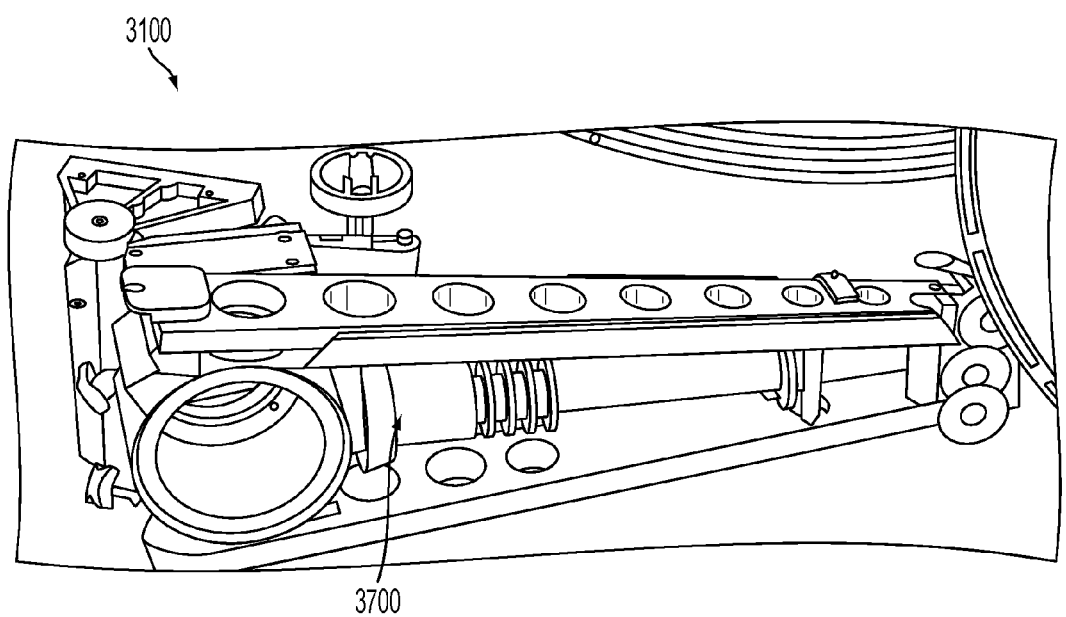
FIG. 37 is a schematic illustration of a tripod positioning structure in its stowed configuration.

A schematic illustration of a knob 3202 is provided in FIG. 36. As shown in FIG. 36, the knob 3202 has an actuator 3602 and a threaded shaft 3604. The actuator 3602 facilitates the rotation of the knob 3202. The shaft 3604 is received in a threaded hole formed in the hub 3108.

Figure 35A:
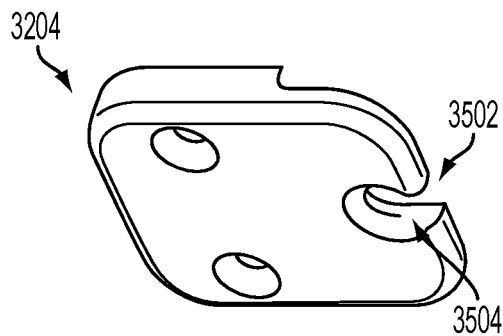
FIG. 35A is a perspective view of a plate.
Figure 35B:
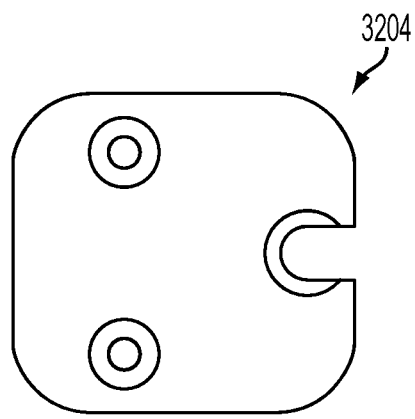
FIG. 35B is a front view of the plate shown in FIG. 35B.

A perspective view of a plate 3204 is provided in FIG. 35A. A front view of the plate 3204 is provided in FIG. 35B. As shown in FIGS. 35A-35B, the plate 3204 has an aperture 3502 with a semi-circular peripheral sidewall 3504 formed therein. The plate 3204 is configured so that: a portion thereof having the aperture 3502 overlaps the hub 3108; and the aperture 3502 receives the shaft 3604 of a respective knob 3202 when a respective leg 3102, 3104 is in its deployed position. Notably, the sidewall 3504 of the aperture 3502 is angled. The angle of the sidewall 3504 is selected to match the angle of a portion 3606 of the knob 3202.

Figure 38:
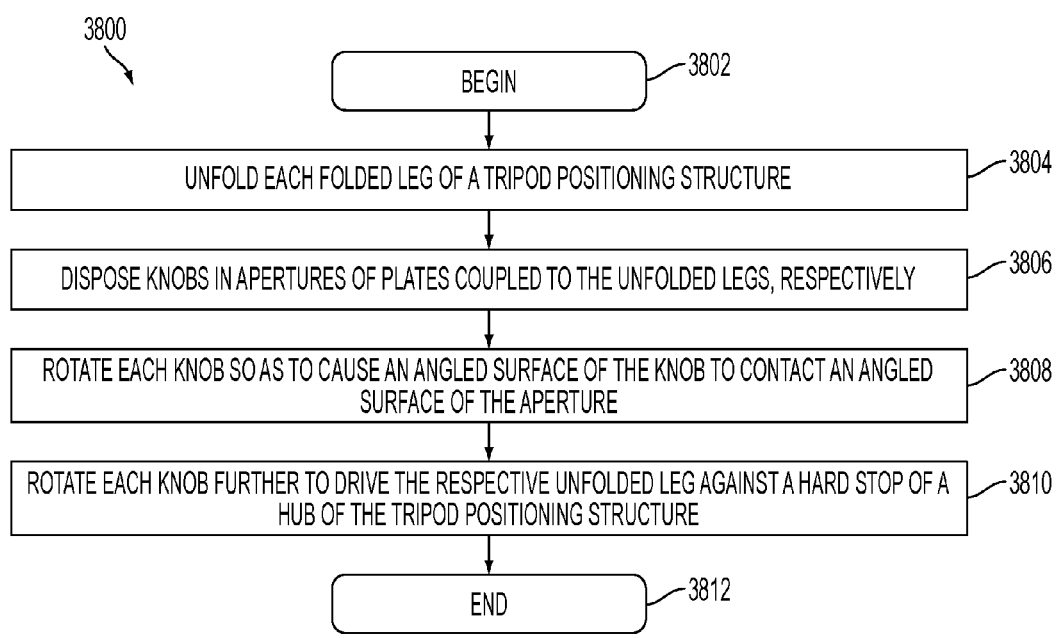
FIG. 38 is a flow diagram of an exemplary method for deploying the tripod positioning structure.

A flow diagram of an exemplary method 3800 for deploying the tripod positioning structure 3100 is provided in FIG. 38. As shown in FIG. 38, the method 3800 begins with step 3802 and continues with step 3804. In step 3804, each folded leg 3102, 3104 of the tripod positioning structure 3100 is unfolded. Once the legs are unfolded, knobs 3202 are disposed in apertures 3502 of plates 3204 coupled to the unfolded legs, respectively, as shown by step 3806. In a next step 3808, each knob 3202 is rotated so as to cause an angled surface 3606 of the knob 3202 to come in contact with an angled surface 3504 of the aperture 3502. Each knob 3202 is further rotated so as to drive the respective unfolded leg 3102, 3104 against a hard stop 3306 of the hub 3108 of the tripod positioning structure 3100, as shown by step 3810. Subsequently, step 3812 is performed where the method ends.

Electronic-to-Hub Coupling Mechanism

One challenging aspect of a design for a PSCA assembly involves the interface between the antenna feed and the satellite transceiver circuitry. This interface must satisfy a number of design criteria. The interface should allow the satellite transceiver circuitry to be easily connected to and disconnected from the antenna feed. The interface should facilitate such connection or disconnection without the need for special tools or visual verification of the assembly. Naturally, the interface system design should be consistent with the overall system requirements of a PSCA assembly. In other words, the interface arrangement should facilitate a PSCA assembly that is compact, lightweight, and easily stowed.

Figure 39:
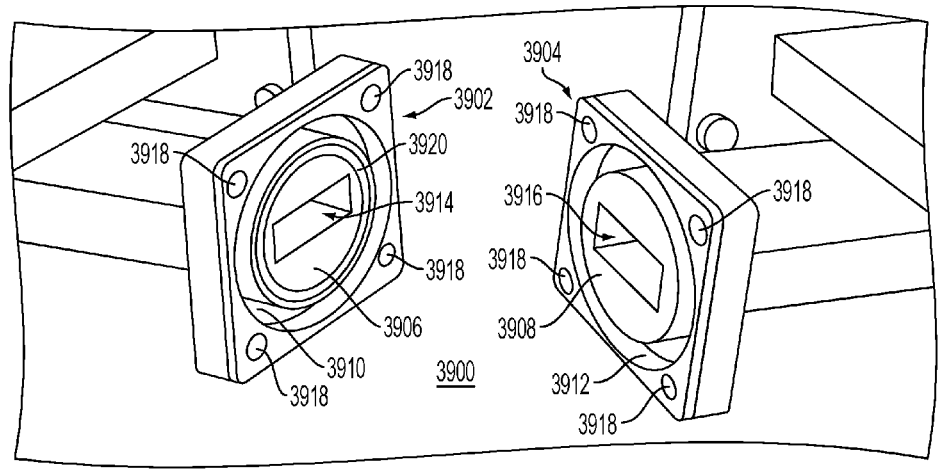
FIG. 39 is a schematic illustration of exemplary components for providing an interface between an antenna feed and RF electronics.

Methods for implementing the interface between an antenna feed and the RF circuitry of the satellite communication transceiver have commonly included a conventional waveguide type interface. The interface includes a flange joint 3000 shown in FIG. 30 in which the planar end faces 3906, 3908 of two opposing waveguide sections 3002, 3904 are butted together. Each end face typically has an O-ring groove 3910, 3912 which surrounds a waveguide cavity 3914, 3916. In some scenarios, four bolt holes 3918 are provided on each end face for securing the two end faces of the assembly together. In other scenarios, these bolt holes are not provided because a blind mating architecture is employed in which tools are not required. The profile of the waveguide cavity in FIG. 39 is shown to be rectangular, but those skilled in the art will appreciate that a similar arrangement can be used with waveguide having other profiles, such as circular or spherical. A rubber O-ring 4110 can be provided in the O-ring groove. One of the end faces will usually include an RF choke point groove 3920 concentric with the O-ring groove. One problem with this arrangement concerns alignment of the two end faces 3906, 3908. In order to ensure low insertion loss and well matched return loss, this flange joint system requires near perfect planar alignment of the two end faces and solid face to face contact pressure.

Figure 40A:
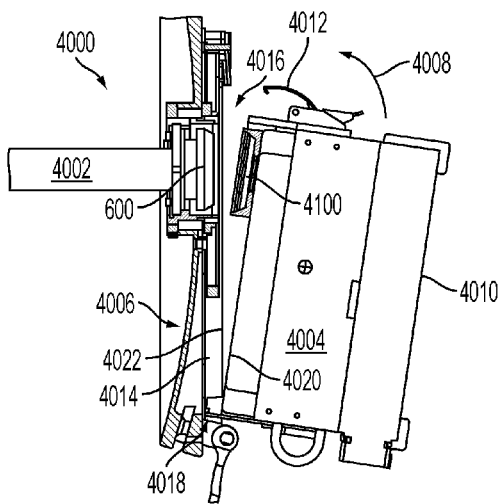
FIGS. 40A-40C each provide a schematic illustration of a satellite communication system which includes an antenna feed associated with an antenna element, and a satellite communications transceiver unit.
Figure 40B:
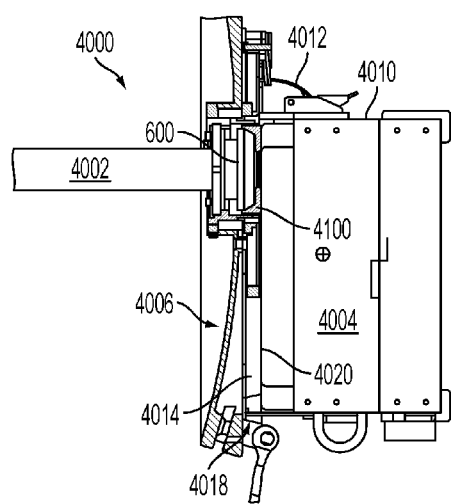
Figure 40C:
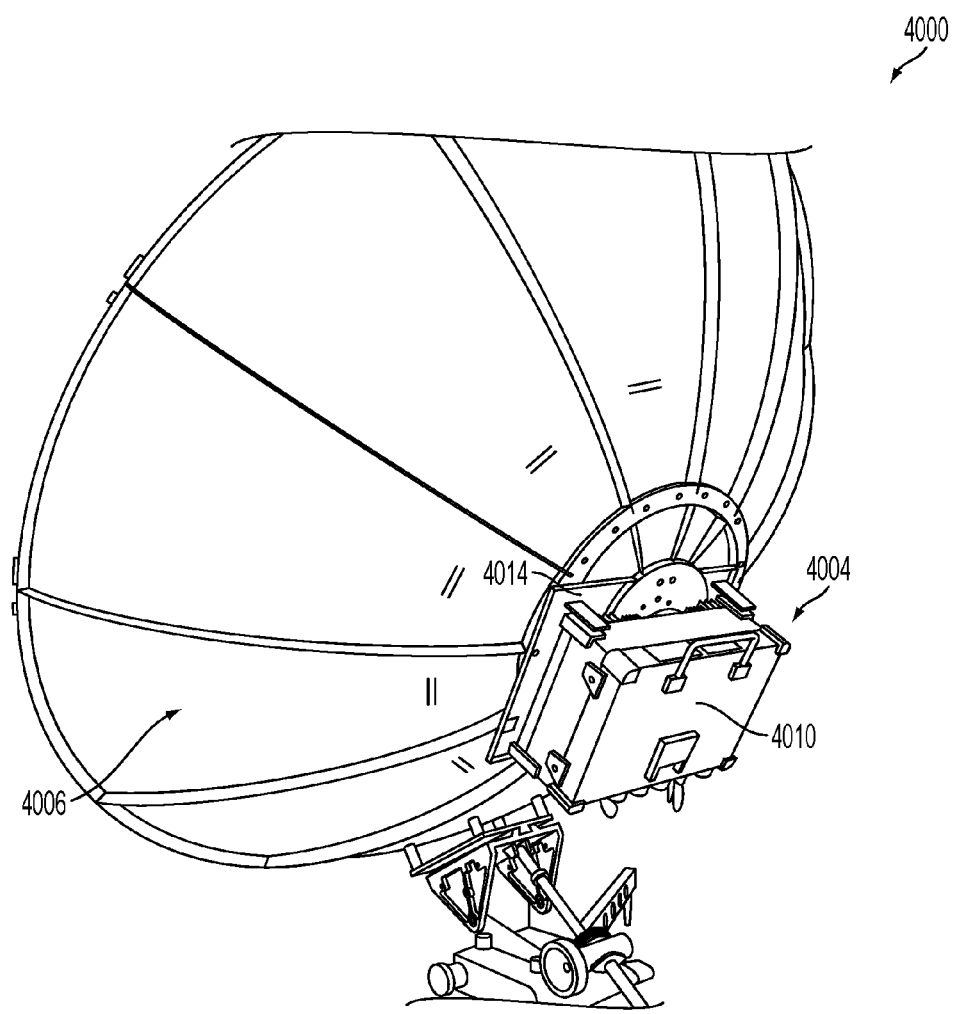

Referring now to FIGS. 40A-40C, there is shown a Satellite Communication System ("SCS") 4000 which includes an antenna feed 4002 associated with an antenna element, such as an RF reflector dish 4006, and a Satellite Communications Transceiver Unit ("SCTU") 4004. The SCTU 4004 can be a complete satellite transceiver system, or can comprise a portion of such a system. For example, in some systems it can be advantageous to provide at least a portion of the RF transceiver front-end circuitry in close proximity to an antenna element, whereas other digital processing elements associated with the transceiver can be located some distance away (e.g., within a shelter). Accordingly, the SCTU 4004 can be comprised of RF transceiver front-end circuitry, and/or additional signal processing circuitry associated with the satellite communication system without limitation.

The SCS 4000 is arranged so that the SCTU 4004 can be mounted directly to the convex side of the reflector dish 4006. In some embodiments, the mounting operation can involve positioning the housing 4010 of the transceiver unit on a mounting bracket 4014 which is located on the convex side of the reflector dish. Subsequently, the housing can be rotated as shown by arrow 4008 until the interface 4016 is established between the antenna feed 4002 and the RF circuitry of the SCTU 4004. Once in position, the housing 4010 can be latched using a clip 4012 which is designed to engage a portion of the bracket 4014. A rear perspective view of the SCTU 4004 mounted directly to the convex side of the reflector dish 4006 is shown in FIG. 40C. Those skilled in the art will appreciate that RF energy is communicated across the interface 4016 between the SCTU 4004 and the antenna feed 4002.

The arrangement described with respect to FIGS. 40A-40C has several advantages. For example, it facilitates a compact, lightweight satellite communication system which provides minimal distance between the RF circuitry in SCTU 4004 and the antenna feed 4002. Still, the arrangement shown presents a challenges insofar as the interface 4016 involves a blind waveguide to waveguide mating operation. In other words, a technician assembling the system in the manner shown in FIGS. 40A-40C will have limited ability to observe or control the alignment of the waveguide end faces comprising the interface 4016. This so called blind mating operation is not well suited to an interface 4016 which uses conventional waveguide end faces. In a system as shown in FIG. 40A-40C, the mechanical tolerances of the housing, bracket and interface will limit the possibility of ensuring the kind of alignment and contact pressure needed for good performance when using conventional waveguide interfaces as described in FIG. 39.

Figure 41:
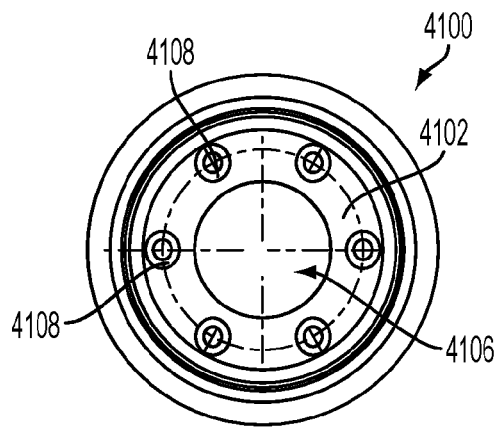
FIGS. 41-43 provide several views of a female mating portion of an inventive waveguide interface.
Figure 42:
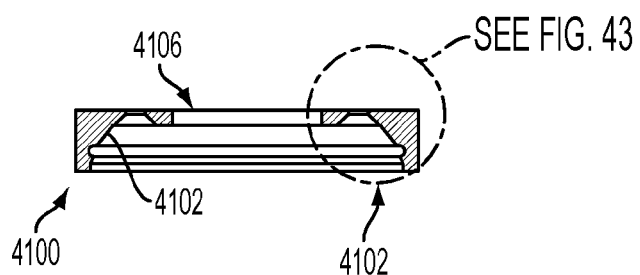
Figure 43:
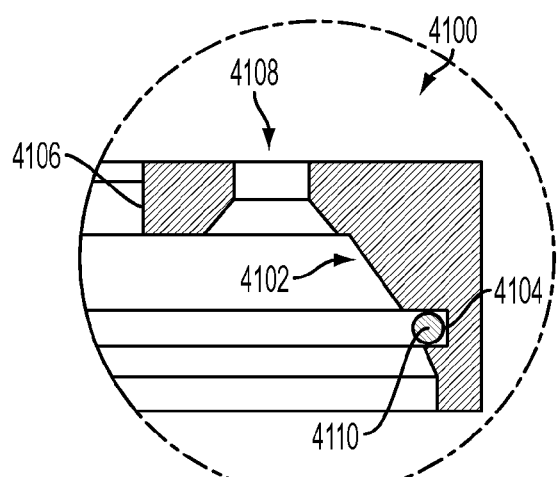

In order to overcome these and other limitations of conventional interfaces, a waveguide interface is provided that can be used advantageously for blind mating operations as described herein. The inventive RF waveguide interface facilitates relatively easy blind mating and de-mating between an antenna feed and corresponding RF electronics, without hardware or visual verification of the assembly. Referring now to FIGS. 41-43, there are shown several views of a female mating portion 4100 of the inventive waveguide interface. In some embodiments of the invention, the female mating portion 4100 is provided on the SCTU 4004 as shown in FIGS. 40A and 40B. In such embodiments, the female mating portion 4100 defines a terminal end of a waveguide (not shown) which serves as an RF antenna port for the SCTU 4004.

As shown in FIGS. 41-43, the female mating portion 4100 includes a concave partial spherical female surface 4102, an O-ring gland 4104 that adjoins the surface 4102, and a waveguide cavity 4106. In the embodiment shown, the waveguide cavity 4106 has a circular profile, but the invention is not limited in this regard. The dimensions of the waveguide cavity will depend on the frequency range over which the antenna system, including the interface 4116 is designed to operate. An O-ring (not shown) is preferably disposed within the O-ring gland 4104. Integrating the O-ring gland 4104 into the surface 4102 can help prevent typical shaft seal binding, while maintaining the O-ring captive during un-mated handling of the female mating portion. An RF window (not shown) can be mounted at the waveguide opening 4106 to prevent dirt and moisture from entering the waveguide when the female mating portion is in an un-mated state. As is well known to those skilled in the art, waveguide windows are advantageously formed of a low-loss dielectric to minimize RF signal loss, while preventing intrusion of water and debris. A plurality of bore holes 4108 can be provided on the female mating portion 4100 to facilitate attachment of the female mating portion to a waveguide end face. For example, one or more screws (not shown) can be inserted through the bore holes 4108 and threaded into a waveguide end face provided in the SCTU 4004.

Figure 44:
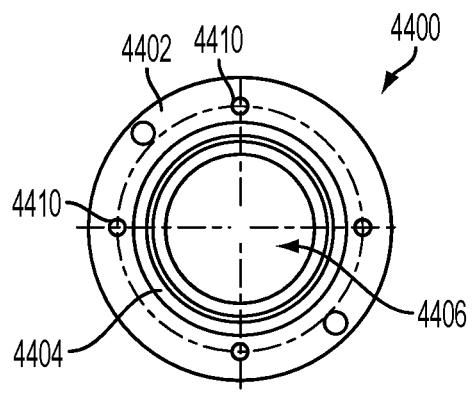
FIGS. 44-46 provide several views of a male mating portion of an inventive waveguide interface.
Figure 45:
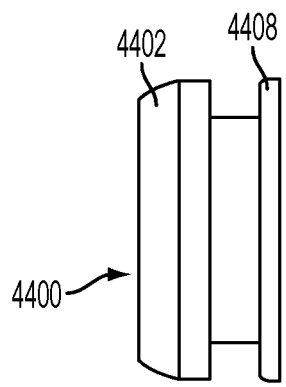
Figure 46:
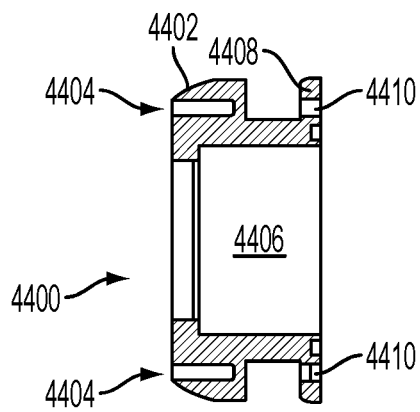

A male mating portion 4400 of the inventive RF waveguide interface 4016 is shown in FIGS. 44-46. The male mating portion 4400 has a convex partial spherical male surface 4402 that substantially matches the shape of the partial spherical female surface 4102 on the female mating portion 4100. The partial spherical male surface is a conjugate of the partial spherical female surface insofar as the two spherical surfaces are defined by a substantially equal radius. As such, the partial spherical male surface 4402 and the partial spherical female surface 4102 will sometimes be referred to herein as the spherical mating surfaces. The male mating portion 4400 includes an RF choke groove 4404, and a waveguide cavity 4406. The waveguide cavity 4406 has a circular cross-section or profile. Still, the invention is not limited in this regard and other cross-sectional profiles are also possible. The dimensions of the waveguide cavity 4406 will depend on the frequency or wavelength for which a satellite communication system is designed. A flange 4408 provided at a base of the male mating portion can serve as a mounting point for attaching the male mating portion to an end face of the antenna feed 4002. As such, the flange 4408 can have a plurality of bore holes 4410 disposed around a periphery thereof. Screws or other fasteners (not shown) can be inserted into the bore holes 4410 and threaded into an end face of antenna feed 4002. The screws or other such fasteners can thus be used to secure the male mating portion to the antenna feed. The RF choke groove 4404 serves to help prevent RF leakage when the male mating portion is inserted into the female mating portion. In this regard, the choke groove 4404 advantageously reduces the need for contact pressure as between the spherical mating surfaces of the female and male mating portions. Accordingly, low insertion loss and well-matched return loss can be achieved at the interface 4016 even without perfect alignment of the male and female mating portions. Notably, these advantages are also achieved with relatively low contact pressure as between the male and female mating portions 4400, 4100. One or more RF windows (not shown) can be mounted at an end portion of the waveguide section 4406 to prevent dirt and moisture from entering the waveguide when the male mating portion is in an un-mated state.

Figure 47:
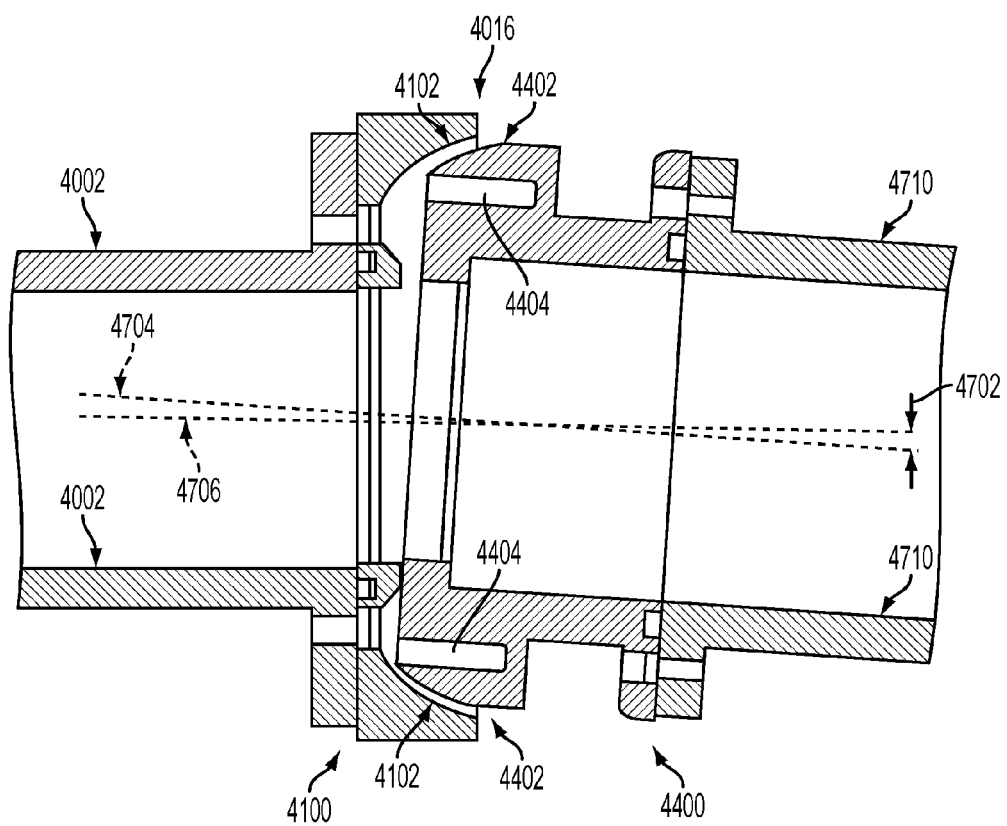
FIG. 47 provides an enlarged view of an interface including a female mating portion and a male mating portion as the RF electronic assembly is rotated into a latched position.

Referring now to FIG. 47, there is shown an enlarged view of interface 4016 including female mating portion 4100 and male mating portion 4400, which are misaligned by an angle 4702. Also shown in FIG. 47 is the waveguide antenna feed 4002 and the waveguide RF port 4710 associated with the RF transceiver. The female mating portion and the male mating portion are said to be in alignment when the RF transmission axes 4704, 4706 are perfectly aligned (i.e., angle 4702 is zero). The partial spherical female surface 4102 contacts the partial spherical male surface 4402 when the female and male mating portions are mated as shown. The matching spherical configurations of the surfaces 4102, 4402 facilitates blind mating of the female and male mating portions, and urges the female and male mating portions into alignment if they are initially misaligned. Moreover, the spherical configuration of the surfaces 4102, 4402 causes the female and male mating portions, when mated, to act as a ball socket swivel, and allows the surfaces 4102, 4402 to remain in contact around their entire respective circumferences when the RF transmissions axes 4704, 4706 of the female and male mating portions are misaligned by an angle 4702 of as much as ten degrees. The RF choke joint groove 4404 is configured to inhibit leakage of RF energy from an interior of said ball and socket swivel at a design frequency of the first and second waveguide.

In the above-described embodiments, the respective positions of the male and female mating portions is not limited to the arrangement as shown. Accordingly, the female mating portion 4100 could be disposed on the waveguide associated with the antenna feed 4102, and the male waveguide 4700 could be disposed on the housing 4010. Also, note that the housing 4010 comprises a first substantially planar face 4020 on which the female mating portion is provided, the mounting 4014 comprises a second substantially planar face 4022 on which the male mating portion is provided. In the embodiment shown, the first and second substantially planar faces are positioned directly adjacent and opposed to each other when the male and female mating portion are mated together. This arrangement, has its benefits as described above, but creates the blind mating scenario described herein.

The female and male mating portions are relatively easy to manufacture on a Computer Numerical Control ("CNC") lathe from brass, aluminum, or stainless steel. For example, stainless steel alloy 4116 with passivation can be used due to its relatively low cost, favorable corrosion resistance, hardness, and compatibility with stainless steel assembly hardware. The exact profile and dimensions of the waveguide cavity will depend on the particular application.

Figure 48:
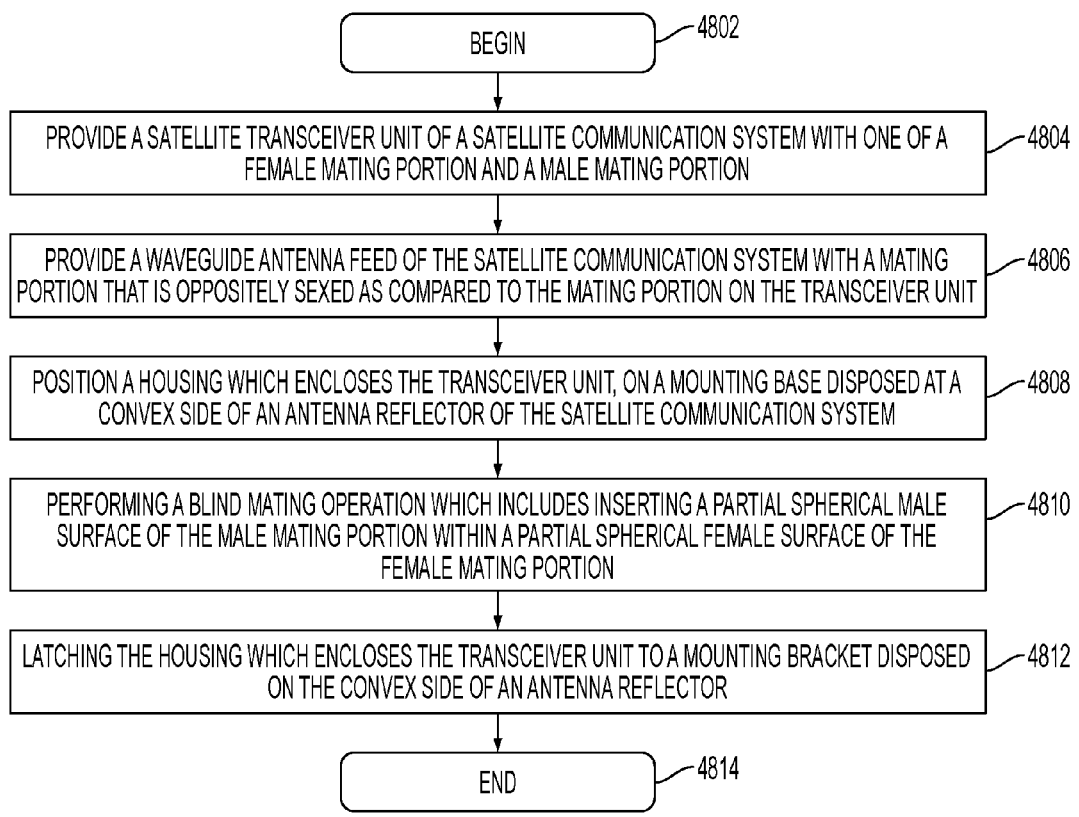
FIG. 48 is a flow diagram of an exemplary method for establishing a waveguide RF interface between a satellite communication transceiver unit and an antenna feed of a satellite communication antenna.

The invention also includes a method for establishing a waveguide RF interface between a satellite communication transceiver unit and an antenna feed of a satellite communication antenna. Referring now to FIG. 48, the method begins in step 4802 and continues to step 4804 in which the transceiver unit of a satellite communication system is provided with one of a female mating portion and a male mating portion. For example, in SCS 4000, transceiver circuitry contained within SCTU 4004 can be provided with one of a female mating portion 4100 or a male mating portion 4400. The method continues in step 4806 by providing the antenna feed of the SCS 4000 with a mating portion that is oppositely sexed as compared to the mating portion on the transceiver circuitry. Accordingly, this step can involve providing antenna feed 4002 with one of a female mating portion 4100 or male mating portion 4400. This step can also involve setting up the antenna and installing the horn with blind mate operations.

The method continues with step 4808, which involves positioning a housing which encloses the transceiver unit, on a mounting structure disposed at a convex side of an antenna reflector of the satellite communication system. For example, as shown in FIGS. 40A-40C, this step can involve positioning housing 4010 on a mounting bracket 4014 which is located on the convex side of the reflector dish 4006. At this point in the process, a portion of the housing 4010 can be seated on a lip 4018 of the mounting bracket as shown in FIG. 40A.

The method continues with the performance of a blind mating operation. A blind mating operation, as that phrase is used here, can be any mating operation in which the waveguide mating portions 4100, 4400 are joined together by an operator or technician under circumstances where there is only a limited ability to ensure proper alignment of the two mating portions. The mating operation generally comprises inserting the partial spherical male surface 4402 of the male mating portion within a partial spherical female surface 4102 of the female mating portion. In general, blind mating operations will involve scenarios where physical access to the mating portions is limited or not possible once they are joined together. In such a scenario, it is difficult for a technician to determine whether axial alignment (i.e., alignment of transmission axes 4704, 4706) has been achieved. An example of a blind mating operation is shown in FIGS. 40A and 40B. After the housing 4010 is positioned on lip 4018, the housing can be rotated as shown by arrow 4008 so that a face of the housing 4010 is positioned directly on or adjacent to the mounting bracket 4014, with little or no clearance space between the two structures. Note that the mating portion 4400 is disposed on the substantially planar face of the housing 4010, and the mating portion 4100 is recessed in the substantially planar mounting bracket 4014. In such a scenario, access to the mating portions 4100, 4400 is extremely limited once the housing is positioned as shown in FIG. 40B. Accordingly, the system configuration and mating operation does not provide adequate means to allow a technician to ensure alignment of the two mating portions during mating operations. Notably, the use of the male and female mating portions with partial spherical mating surfaces as described herein can ensure low insertion loss and matched return loss regardless of any potential misalignment caused by the blind mating operation.

Once the blind mating operation has been performed as described herein, the housing which encloses the transceiver unit can be latched in step 4812 to the mounting bracket. As shown in FIGS. 40A and 40B, this can involve the use of a latch 4012, which secures the housing to the mounting bracket. Finally, the process ends in step 4814.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

We claim:

1. A satellite communication reflector system, comprising:
a Parabolic Segmented Antenna ("PSA") reflector with a base panel and a plurality of identical panels that are interchangeable and can be compactly stored in a nested stacked arrangement;
a center hub including a plurality of receiving structures which are each configured to engage a respective securing portion provided on the plurality of identical panels; and
a plurality of engagement members which are respectively configured to removably secure each of said plurality of identical panels to its respective receiving structure.

2. The satellite communication reflector system of claim 1, wherein each of the plurality of identical panels has a trapezoid shape with a concave cross-sectional profile.

3. The satellite communication reflector system of claim 1, wherein each of the plurality of identical panels comprises stamped metal or composite with no core, a honeycomb core, or a foam core.

4. The satellite communication reflector system of claim 1, wherein each of the plurality of identical panels has a curved body and angled sidewalls.

5. The satellite communication reflector system of claim 1, wherein adjacent ones of the plurality of identical panels are fastened at a perimeter to each other via panel-to-panel latching mechanisms.

6. The satellite communication reflector system of claim 1, wherein the panel-to-panel latching mechanisms have form factors and positions on the panels that ensure the panel-to-panel latching mechanisms will not interfere with the nested arrangement.

7. A satellite communication reflector system, comprising:
a Parabolic Segmented Antenna ("PSA") reflector with a base panel and a plurality of identical panels that are interchangeable and can be compactly stored in a nested stacked arrangement; and
a center hub comprising a plurality of insert spaces formed along a peripheral sidewall thereof and a plurality of engagement members protruding into the plurality of insert spaces;
wherein each of the plurality of identical panels is mounted on the center hub.

8. The satellite communication reflector system of claim 7, wherein each of the plurality of identical panels comprises a tab that is sized and shaped to be inserted into a respective insert space of the plurality of insert spaces.

9. The satellite communication reflector system of claim 8, wherein the respective insert space has a chamfered sidewall to allow the tab to be inserted therein at an angle relative to a center axis of the respective insert space.

10. The satellite communication reflector system of claim 9, wherein the tab has at least one aperture formed therein that engages a respective one of the plurality of engagement members when the orientation of the tab is transitioned from an angled orientation relative to the center axis to a generally parallel orientation relative to the center axis.

11. The satellite communication reflector system of claim 10, wherein each of the plurality of engagement members comprises a set screw with a conical or spherical end, and the aperture comprises a countersink hole with an angled sidewall.

12. The satellite communication reflector system of claim 10, wherein the orientation of the angled sidewall is changed relative to the center axis in response to a latching together of the plurality of identical panels or an unlatching of the plurality of identical panels from each other.

13. A satellite communication reflector system, comprising:
a Parabolic Segmented Antenna ("PSA") reflector with a base panel and a plurality of identical panels that are interchangeable and can be compactly stored in a nested stacked arrangement;
a center hub comprising a groove formed in a peripheral portion thereof and a plurality of engagement members protruding into the groove;
wherein each of the plurality of identical panels is mounted on the center hub.

14. The satellite communication reflector system of claim 13, wherein each of the plurality of engagement members comprises at least one radial set screw with a conical or spherical end.

15. The satellite communication reflector system of claim 14, wherein a screw depth of the radial set screw is adjustable to control angle of a respective one of the plurality of identical panels relative to the central hub.

16. The satellite communication reflector system of claim 13, wherein each of the plurality of identical panels comprises a sidewall with at least one dimple molded therein for engaging a respective engagement member of the engagement members.

17. The satellite communication reflector system of claim 16, wherein the dimple is caused to engage the respective engagement member when the plurality of identical panels are latched together.

18. The satellite communication reflector system of claim 16, wherein the dimple is caused to disengage the respective engagement member when the plurality of identical panels are unlatched from each other.

19. The satellite communication reflector system of claim 16, wherein the sidewall of each of the plurality of identical panels is retained in the groove as a result of (a) an engagement of the dimple to the respective engagement member, and (b) frictional contact between the sidewall and a surface of the center hub.

20. A satellite communication reflector system, comprising:
a Parabolic Segmented Antenna ("PSA") reflector with a base panel and a plurality of identical panels that are interchangeable and can be compactly stored in a nested stacked arrangement;
wherein the base panel comprises a tab which is clamped within an insert space of a center hub via a securing member; and
wherein reflector wind moment loads are transferred to a positioner structure via the base panel.

21. The satellite communication reflector system of claim 20, wherein the securing member comprises a draw screw with a cam draw lever attached thereto.

22. A satellite communication reflector system, comprising:
a Parabolic Segmented Antenna ("PSA") reflector with a base panel and a plurality of identical panels that are interchangeable and can be compactly stored in a nested stacked arrangement;
wherein the base panel comprises a push/pull toggle clamp for clamping the base panel to a center hub, and wherein reflector wind moment loads are transferred to a positioner structure via the base panel of the plurality of identical panels.

23. A satellite communication reflector system, comprising:
- a Parabolic Segmented Antenna ("PSA") reflector with a base panel and a plurality of identical panels that are interchangeable and can be compactly stored in a nested stacked arrangement;
- wherein adjacent panels of the plurality of identical panels latch together via a latching mechanism, the latching mechanism including a draw latch pivotally coupled to a first panel of the adjacent panels and an engagement member coupled to a second panel of the adjacent panels.

24. The satellite communication reflector system of claim 23, wherein the draw latch comprises a catch member configured to snappingly engage the engagement member.

25. The satellite communication reflector system of claim 23, wherein the draw latch comprises a plurality of circular spring flexure joints and a cantilever arm to guide the catch member to the engagement member.

26. The satellite communication reflector system of claim 25, wherein the cantilever arm has an arched profile, a straight profile or a generally "Z" shaped profile.

27. The satellite communication reflector system of claim 25, wherein the draw latch comprises a release tab protruding out and away from one of the plurality of circular spring flexure joints, and configured to facilitate a disengagement of the catch member from the engagement member.

28. A satellite communication reflector system, comprising:
- a Parabolic Segmented Antenna ("PSA") reflector with a base panel and a plurality of identical panels that are interchangeable and can be compactly stored in a nested stacked arrangement;
- wherein adjacent panels of the plurality of identical panels latch together via a latching mechanism, the latching mechanism comprising a captive wing-nut threaded stud which locks to a forked clevis bracket.

29. The satellite communication system of claim 1, further comprising a plurality of interchangeable feedhorn assemblies which operate at a plurality of different frequencies.

30. A satellite communication reflector system, comprising:
- a Parabolic Segmented Antenna ("PSA") reflector with a base panel, and a plurality of identical panels that are interchangeable and can be compactly stored in a nested stacked arrangement; and
- a plurality of interchangeable feedhorn assemblies which operate at a plurality of different frequencies, wherein each of the plurality of interchangeable feedhorn assemblies comprises a shaft having a feedhorn disposed at a first end thereof and a feed flange disposed at a second end thereof.

31. The satellite communication reflector system of claim 30, wherein the feed flange is configured to facilitate a coupling of the shaft to a center hub.

32. The satellite communication reflector system of claim 31, wherein the feed flange is sized and shaped to snuggly fit within a socket attached to or integrally formed with the center hub.

33. The satellite communication reflector system of claim 31, wherein
- the feed flange has a plurality of indentations formed in a peripheral edge thereof,
- the center hub has a pin securely coupled thereto, and
- an angular orientation of an antenna feed relative to the center hub is adjusted by removing horn and re-inserting with a new polarization notch or scallop.

34. The satellite communication reflector system of claim 30, further comprising a plurality of levers pivotally mounted to the feed flange for facilitating a secure coupling of a feedhorn assembly to a center hub.

35. The satellite communication reflector system of claim 34, wherein each lever of the plurality of levers comprises an arm to enable rotation thereof relative to the feed flange.

36. The satellite communication reflector system of claim 35, wherein the arm contacts the shaft when the lever is in its closed position so as to provide structural support to the feedhorn assembly.

37. The satellite communication reflector system of claim 34, wherein each lever of the plurality of levers comprises a beveled cam surface to engage a beveled cam groove formed in a sidewall of a socket attached to or integrally formed with the center hub.

38. The satellite communication reflector system of claim 37, wherein a camming engagement of the beveled cam surface and the beveled can groove creates high contact forces between the feed flange and the socket for carrying cantilevered bending moment loads.

39. A satellite communication reflector system, comprising:
- a Parabolic Segmented Antenna ("PSA") reflector with a base panel, and a plurality of identical panels that are interchangeable and can be compactly stored in a nested stacked arrangement; and
- a tripod positioning structure to which the PSA reflector is mounted via a dove tail mounting mechanism, wherein a first mating portion of the dove tail mounting mechanism is mounted on a base panel of the plurality of identical panels, and a second mating portion is coupled to or integrally formed with the tripod positioning structure.

40. The satellite communication reflector system of claim 39, wherein the first and second mating portions are configured such that an interference fit therebetween can be created by a screw drive that provides a rigid connection between the base panel and the tripod positioning structure.

41. The satellite communication reflector system of claim 40, wherein the rigid connection resists applied moments and linear displacement of the base panel and the tripod positioning structure.

42. A satellite communication reflector system, comprising:
- a Parabolic Segmented Antenna ("PSA") reflector with a base panel, and a plurality of identical panels that are interchangeable and can be compactly stored in a nested stacked arrangement; and
- a tripod positioning structure to which the PSA reflector is mounted via a dove tail mounting mechanism, wherein tripod positioning structure comprises a hub, a stationary leg and a plurality of folding legs pivotally attached to the hub.

43. The satellite communication reflector system of claim 42, wherein the plurality of folding legs are nested within the stationary leg when stowed.

44. The satellite communication reflector system of claim 42, wherein the stationary leg comprises an internal cavity in which other components of the satellite communication system can be stored.

45. The satellite communication reflector system of claim 42, wherein the plurality of folding legs are coupled to the hub via hinges.

46. The satellite communication reflector system of claim 45, further comprising a hard stop against which the plurality of folding legs can be preloaded.

47. A satellite communication system, comprising:
an antenna including at least one antenna element and a waveguide antenna feed;
a satellite communication transceiver unit comprising RF circuitry;
a mounting structure configured to facilitate removable mounting of said satellite communication transceiver on said antenna element;
one of a male mating portion and a female mating portion disposed on said satellite communication transceiver unit and forming a terminal end of a waveguide RF antenna port for said satellite communication transceiver unit;
one of said male mating portion and said female mating portion disposed on a terminal end of said waveguide antenna feed, and oppositely sexed as compared to the mating portion provided on said satellite communication transceiver unit;
a partial spherical female surface defined on said female mating portion configured to engage a partial spherical male surface defined on said male mating portion;
wherein said female mating portion and said male mating portion together form a ball socket swivel when said satellite communication transceiver unit is mounted in said mounting structure, and said male and female mating portion are mated together.

48. The satellite communication system according to claim 47, wherein a position of said waveguide antenna port and a position of said terminal end of said waveguide feed limit physical access to said male and female mating portions when said male and female mating portions are mated together.

49. The satellite communication system according to claim 47, wherein said antenna element is a dish reflector.

50. The satellite communication system according to claim 49, wherein said mounting structure is disposed on a back side of said dish reflector.

51. The satellite communication system according to claim 47, wherein said housing comprises a first substantially planar face on which said male or female mating portion is provided, said mounting structure comprises a second substantially planar face on which said male or female mating portion is provided, and wherein said first and second substantially planar faces are positioned directly adjacent and opposed to each other when said male and female mating portion are mated together.

52. A method for providing an RF interface between a waveguide antenna feed of a satellite communication antenna and a waveguide RF antenna port of a satellite communication transceiver unit, comprising:
providing said waveguide RF antenna port with one of a male and a female mating portion;
providing said waveguide antenna feed with one of said male and said female mating portions, oppositely sexed as compared to the mating portion on said waveguide RF antenna port;
positioning a housing enclosing said satellite communication transceiver unit on a mounting structure disposed on an antenna element of said satellite communication antenna;
performing a blind mating operation which includes inserting a partial spherical male surface of the male mating portion within a partial spherical female surface of the female mating portion.

53. The method according to claim 52, further comprising latching said housing to said mounting structure.

54. The method according to claim 52, further comprising forming with said male and female mating portions a ball socket swivel when partial spherical male surface is inserted within said partial spherical female surface.

55. The method according to claim 52, wherein said positioning step further comprises rotating said housing from a first position in which said male and female portions are separated to a second position in which said partial spherical male surface is inserted within said partial spherical female surface.

56. The method according to claim 52, wherein said blind mating operation substantially excludes access to said male and female mating portions when male and female portions are mated together.

57. A method for communicating RF energy across a waveguide interface, comprising:
disposing a female mating portion at a terminal end of a first waveguide;
disposing a male mating portion at a terminal end of a second waveguide;
providing a partial spherical male surface on said male mating portion;
providing a partial spherical female surface on said female mating portion;
forming a ball and socket swivel by receiving said partial spherical male surface within a portion of said female mating portion defined by said partial spherical female surface; and
communicating RF energy between said first waveguide and said second waveguide, through said male and female mating portions.

58. The method according to claim 57, further comprising maintaining continuous physical contact between said partial spherical female surface and said partial spherical male surface throughout an angle of 360 degrees about a transmission axis of said first waveguide when said transmission axis of said first waveguide is misaligned with a transmission axis of said second waveguide.

59. The method according to claim 57, further comprising inhibiting leakage of RF energy from said ball socket swivel by providing an RF choke joint groove disposed along a periphery of said partial spherical male surface.

60. The method according to claim 57, further comprising preventing binding between said spherical male surface and said spherical female surface of said ball socket swivel by providing an O-ring disposed in an O-ring gland of said partial spherical male surface or said partial spherical female surface.

61. The method according to claim 60, wherein the O-ring comprises a conductive or non-conductive material.

62. The method according to claim 57, further comprising using said first waveguide as antenna feed for a satellite communication antenna.

63. A waveguide RF interface, comprising:
a female mating portion at a terminal end of a first waveguide including a partial spherical female surface;
a male mating portion at a terminal end of a second waveguide including a partial spherical male surface;
said partial spherical male surface removably disposed within a part of said female mating portion defined by said partial spherical female surface to form a ball and socket swivel; and
an RF choke joint groove disposed along a periphery of said partial spherical male surface, said RF choke joint groove configured to inhibit leakage of RF energy from an interior of said ball and socket swivel.

64. The waveguide RF interface according to claim 63, wherein said partial spherical female surface and said partial spherical male surface maintain continuous physical contact throughout an angle of 360 degrees about a transmission axis of said first waveguide when said transmission axis of said first waveguide is misaligned with a transmission axis of said second waveguide.

65. The waveguide RF interface according to claim 63, further comprising an O-ring disposed in an O-ring gland of said partial spherical male surface or said partial spherical female portion.

66. The waveguide RF interface according to claim 63, wherein said first waveguide is an antenna feed of a satellite communication antenna.

* * * * *